(12) United States Patent
Ohashi

(10) Patent No.: US 9,043,466 B2
(45) Date of Patent: May 26, 2015

(54) NETWORK MANAGEMENT APPARATUS, NETWORK MANAGEMENT METHOD, AND COMPUTER-READABLE STORAGE MEDIUM

(75) Inventor: Toshio Ohashi, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1409 days.

(21) Appl. No.: 12/499,378

(22) Filed: Jul. 8, 2009

(65) Prior Publication Data

US 2010/0011106 A1 Jan. 14, 2010

(30) Foreign Application Priority Data

Jul. 10, 2008 (JP) ................. 2008-180048

(51) Int. Cl.
*G06F 15/173* (2006.01)
*H04L 12/24* (2006.01)
*H04L 29/06* (2006.01)

(52) U.S. Cl.
CPC ............... *H04L 12/24* (2013.01); *H04L 41/00* (2013.01); *H04L 41/0273* (2013.01); *H04L 41/22* (2013.01); *H04L 69/28* (2013.01)

(58) Field of Classification Search
CPC .......... G06F 8/34; G06Q 10/02; G06Q 10/06; G06Q 10/06315; H04L 12/282; H04L 41/22; H04L 67/1008; H04L 67/101; H04L 67/1014
USPC ....................................................... 709/226
See application file for complete search history.

(56) References Cited

U.S. PATENT DOCUMENTS

| | | | |
|---|---|---|---|
| 6,308,205 B1 * | 10/2001 | Carcerano et al. ............ | 709/221 |
| 7,844,968 B1 * | 11/2010 | Markov ........................ | 718/102 |
| 8,056,079 B1 * | 11/2011 | Martin et al. ................. | 718/102 |
| 2002/0062239 A1 * | 5/2002 | Smith et al. ....................... | 705/8 |
| 2002/0066010 A1 * | 5/2002 | Bourke-Dunphy et al. .. | 713/100 |
| 2003/0088651 A1 * | 5/2003 | Wilson, Jr. .................... | 709/221 |
| 2003/0214657 A1 * | 11/2003 | Stringham ..................... | 358/1.1 |
| 2005/0060397 A1 * | 3/2005 | Barthram et al. ............. | 709/223 |
| 2005/0270566 A1 * | 12/2005 | Tanaka ......................... | 358/1.15 |
| 2006/0271419 A1 * | 11/2006 | O'Sullivan ........................ | 705/8 |
| 2008/0123130 A1 * | 5/2008 | Matsumoto et al. ......... | 358/1.15 |
| 2009/0133026 A1 * | 5/2009 | Aggarwal et al. ............. | 718/103 |

FOREIGN PATENT DOCUMENTS

JP 2000-32430 1/2000

* cited by examiner

*Primary Examiner* — Christopher Biagini
(74) *Attorney, Agent, or Firm* — Canon USA Inc. IP Division

(57) ABSTRACT

A network management apparatus that executes a registered task at a specified time on a device connected thereto via a network includes a determination unit configured to determine whether a registered task related to a new task exists, and a registration unit configured to, if the determination unit determines that the registered task related to the new task exists, specify a time when the new task can be executed, to accept a registration of the new task to be executed at the time, and not to accept the registration of the new task to be executed at other than the time.

3 Claims, 21 Drawing Sheets

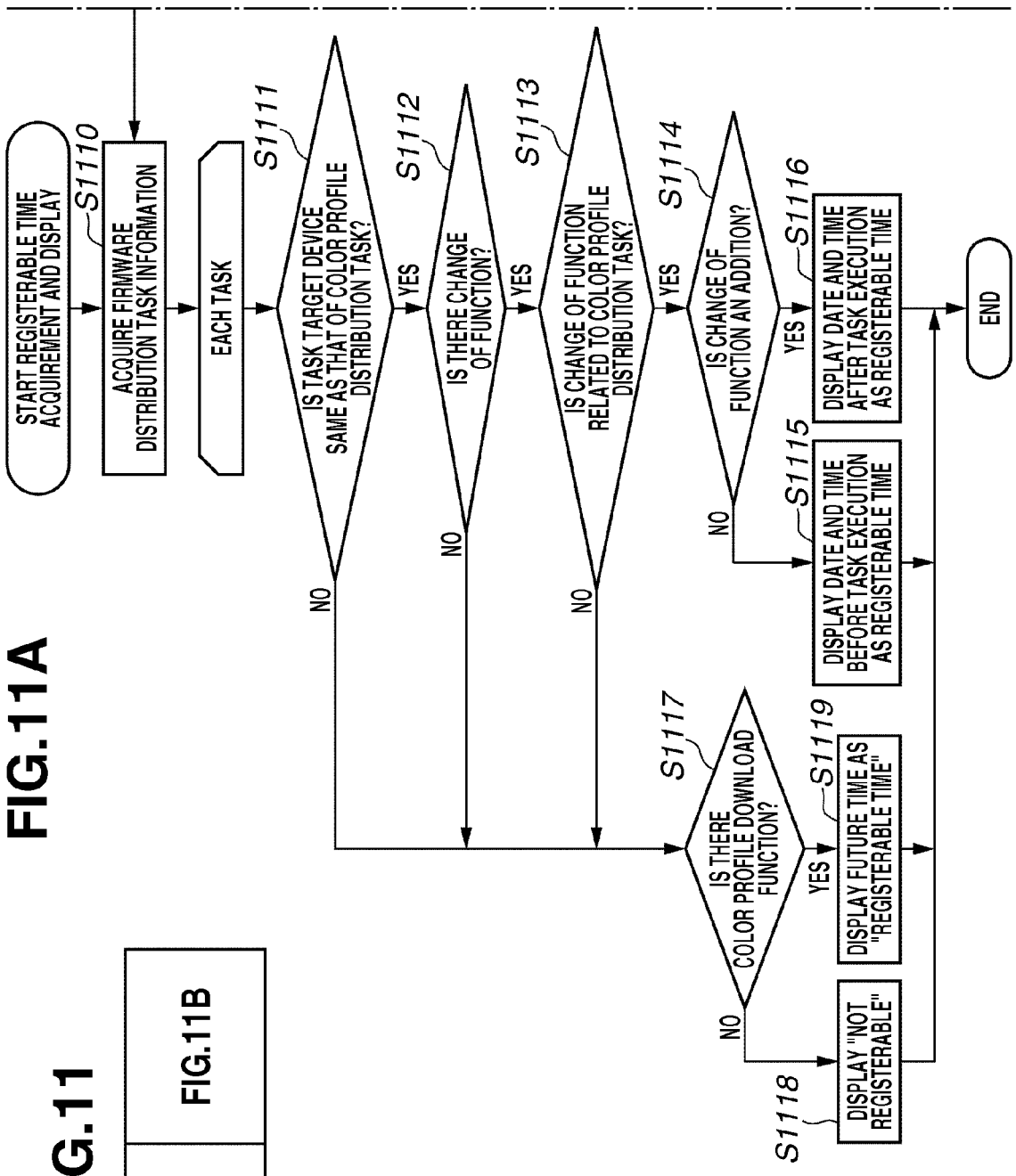

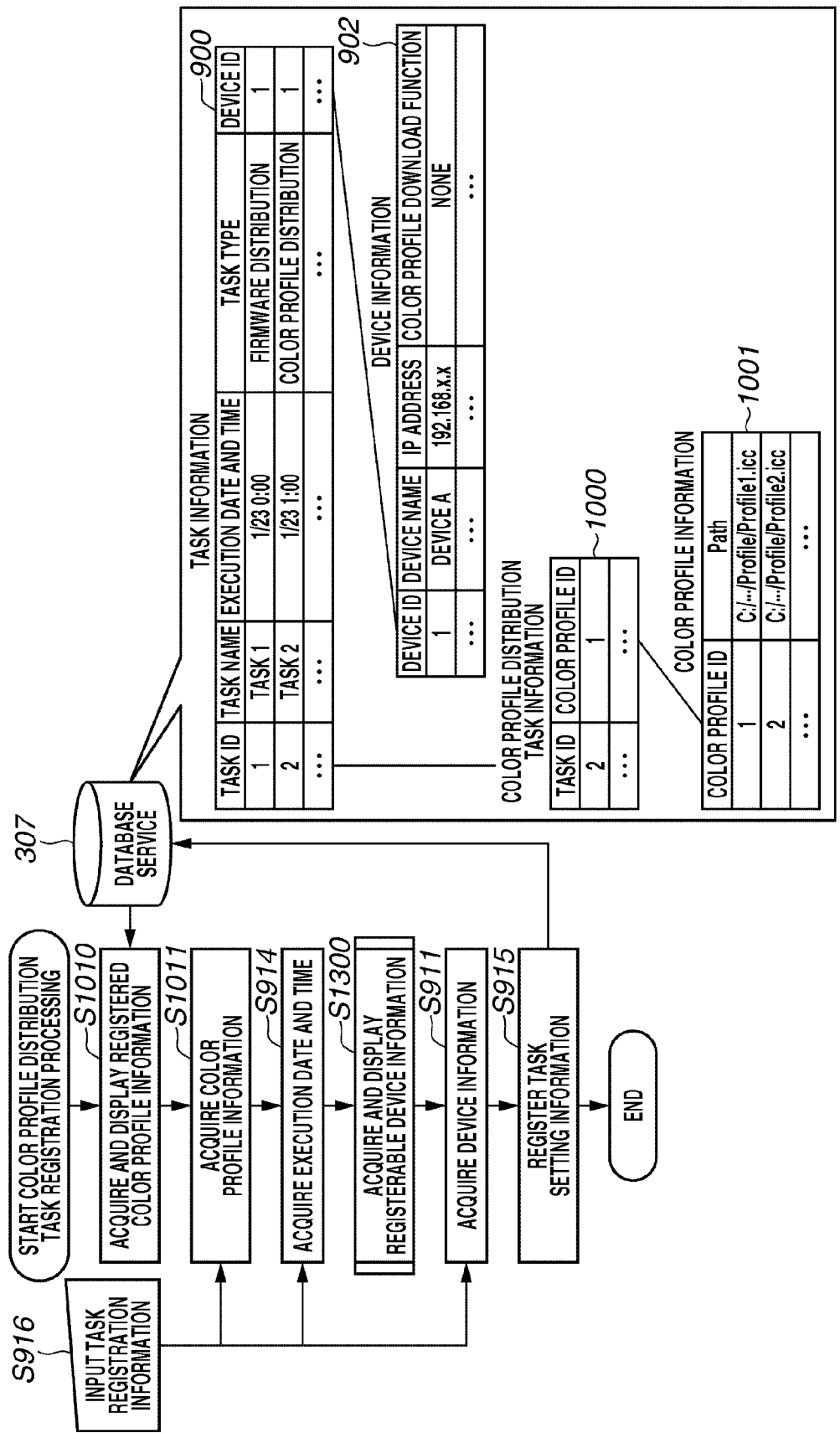

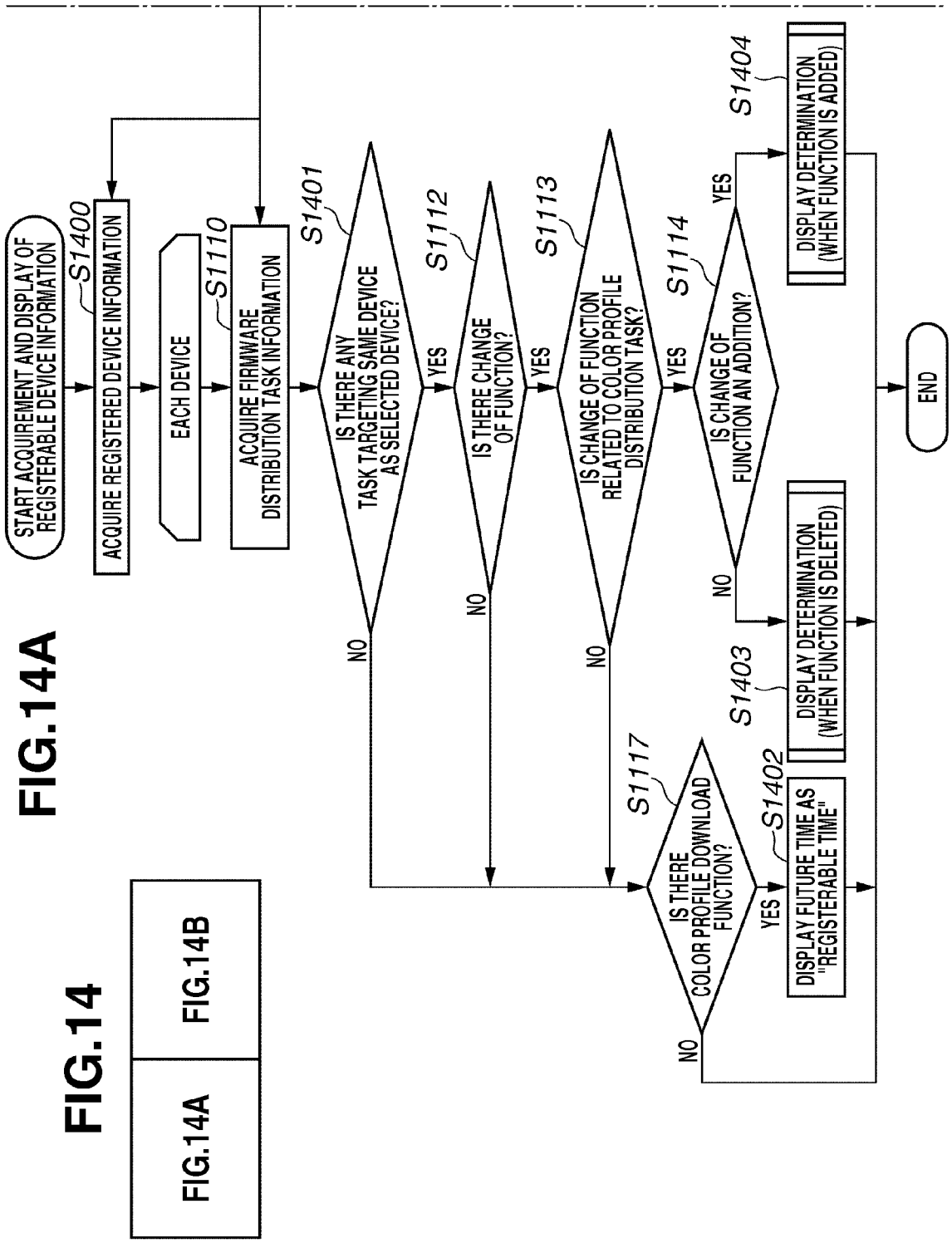

FIG.15

TARGET DEVICE SELECTION SCREEN

[1501] SELECT ALL  [1502] CANCEL ALL

| | DEVICE NAME | PRODUCT NAME | IP ADDRESS | INSTALLATION PLACE |
|---|---|---|---|---|
| ☑ | Device 1 | Product A | XX.XX.XX.XX | 1F |
| ☑ | Device 2 | Product A | XX.XX.XX.XX | 2F |
| ☐ | Device 3 | Product B | XX.XX.XX.XX | 3F |

1500

1503 — SET AS TARGET DEVICE

600

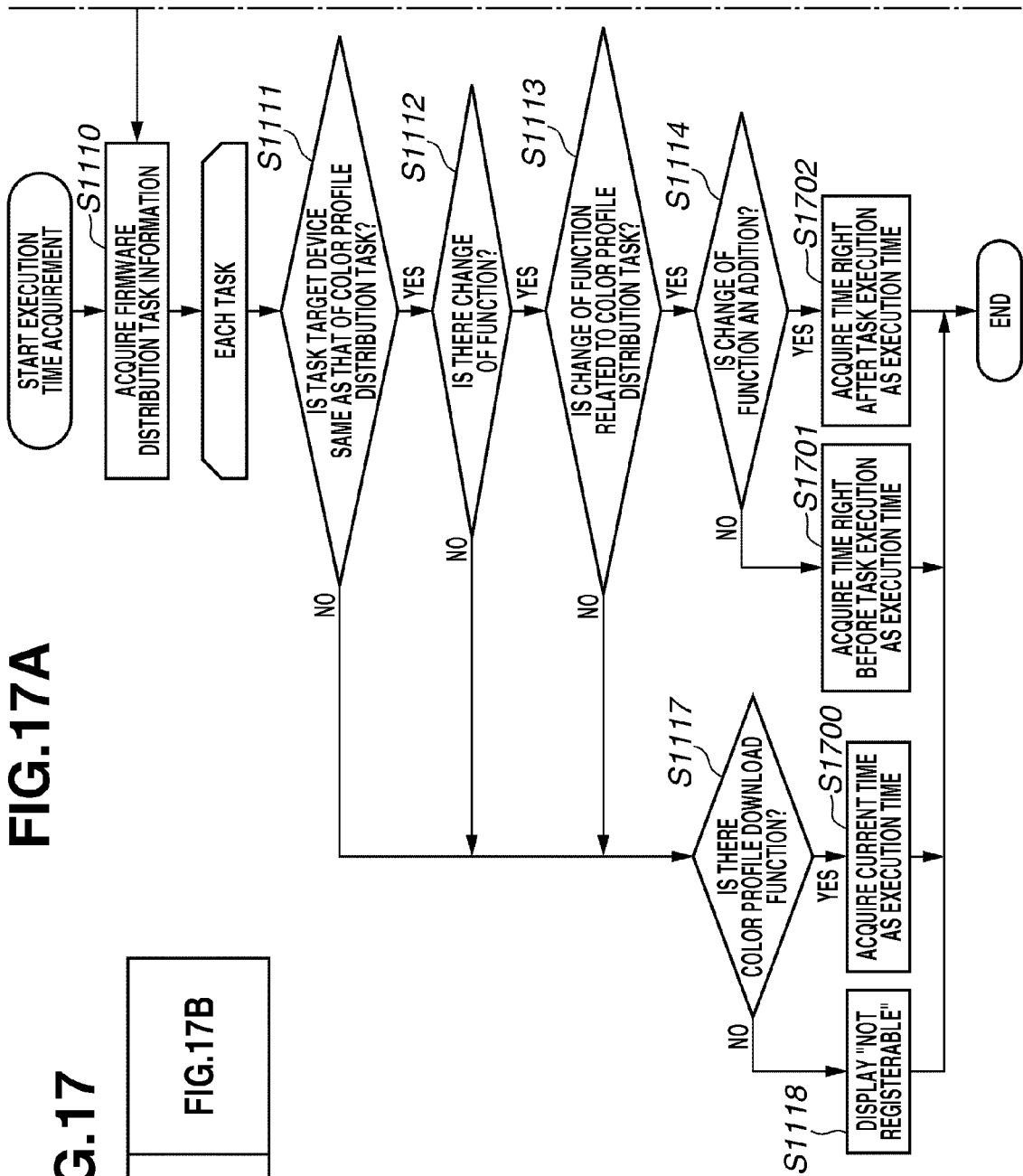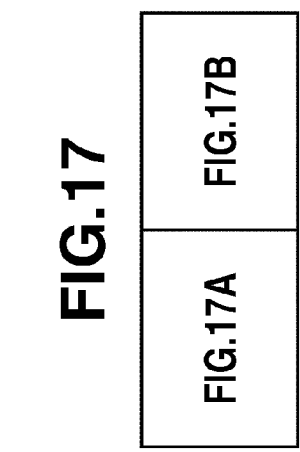

NETWORK MANAGEMENT APPARATUS, NETWORK MANAGEMENT METHOD, AND COMPUTER-READABLE STORAGE MEDIUM

BACKGROUND OF THE INVENTION

1. Field of the Invention

The present invention relates to a network management apparatus that executes a registered task on a device connected thereto via a network and a network management method.

2. Description of the Related Art

Some conventional network management apparatuses each have a task function for automatically executing processing at a specified time by registering as a task an execution day and time, a target network device, and execution processing.

Whether a network device can execute a task depends on whether the network device has a necessary function for executing the task. Therefore, a conventional network management apparatus displays only the network device capable of executing the task as a selectable device after performing a function check on each network device when registering the task. A user can select a task execution target device from among displayed devices (refer to Japanese Patent Application Laid-Open No. 2000-32430).

SUMMARY OF THE INVENTION

According to an aspect of the present invention, a network management apparatus that executes a registered task at a specified time on a device connected thereto via a network, includes a determination unit configured to determine whether a registered task related to a new task exists, and a registration unit configured to, if the determination unit determines that the registered task related to the new task exists, specify a time when the new task can be executed, to accept a registration of the new task to be executed at the time, and not to accept the registration of the new task to be executed at other than the time.

Further features and aspects of the present invention will become apparent from the following detailed description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 13 illustrates an operation when a task for delivering a color profile is registered by a network management apparatus according to a second exemplary embodiment of the present invention.

FIG. 15 illustrates an example of a screen for selecting a target device in the network management apparatus according to the second exemplary embodiment of the present invention.

DETAILED DESCRIPTION OF THE EMBODIMENTS

Various exemplary embodiments, features, and aspects of the invention will be described in detail below with reference to the drawings.

Figure 1:
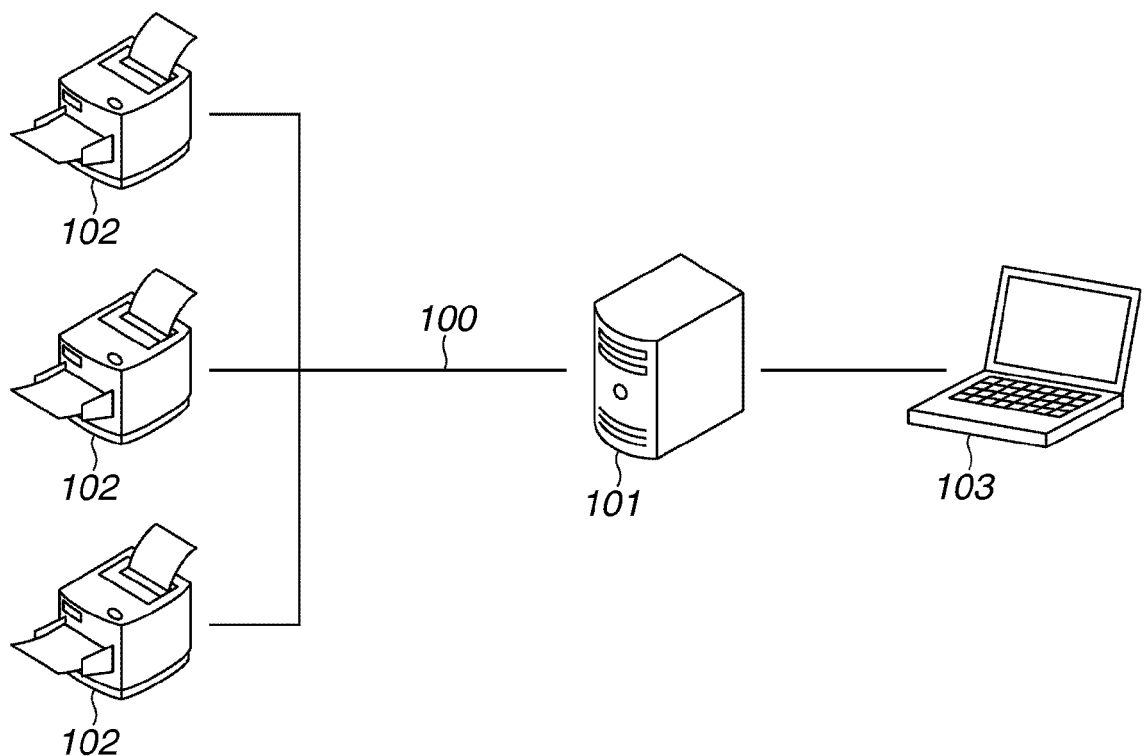
FIG. 1 illustrates a configuration of a network device management system according to a first exemplary embodiment of the present invention.

FIG. 1 illustrates an entire configuration of a network device management system according to a first exemplary embodiment of the present invention. The network device management system illustrated in FIG. 1 includes a network management apparatus 101, a plurality of network devices 102, a client apparatus 103, and a network 100, via which the network management apparatus 101, the network device 102, and the client apparatus 103 are connected to each other.

The network management apparatus 101 and the client apparatus 103 have a configuration of a general-purpose computer. The network device 102 is connected to the network 100 and thus can be managed by the network management apparatus 101. According to the first exemplary embodiment, the network device 102 is, for example, a multifunction peripheral (MFP). However, the network device 102 is not limited to the MFP but may be a printer, a fax, and etc., other than the MFP.

The network management apparatus 101, the network device 102, and the client apparatus 103, which constitute a network device management system, will be described below.

Figure 2:
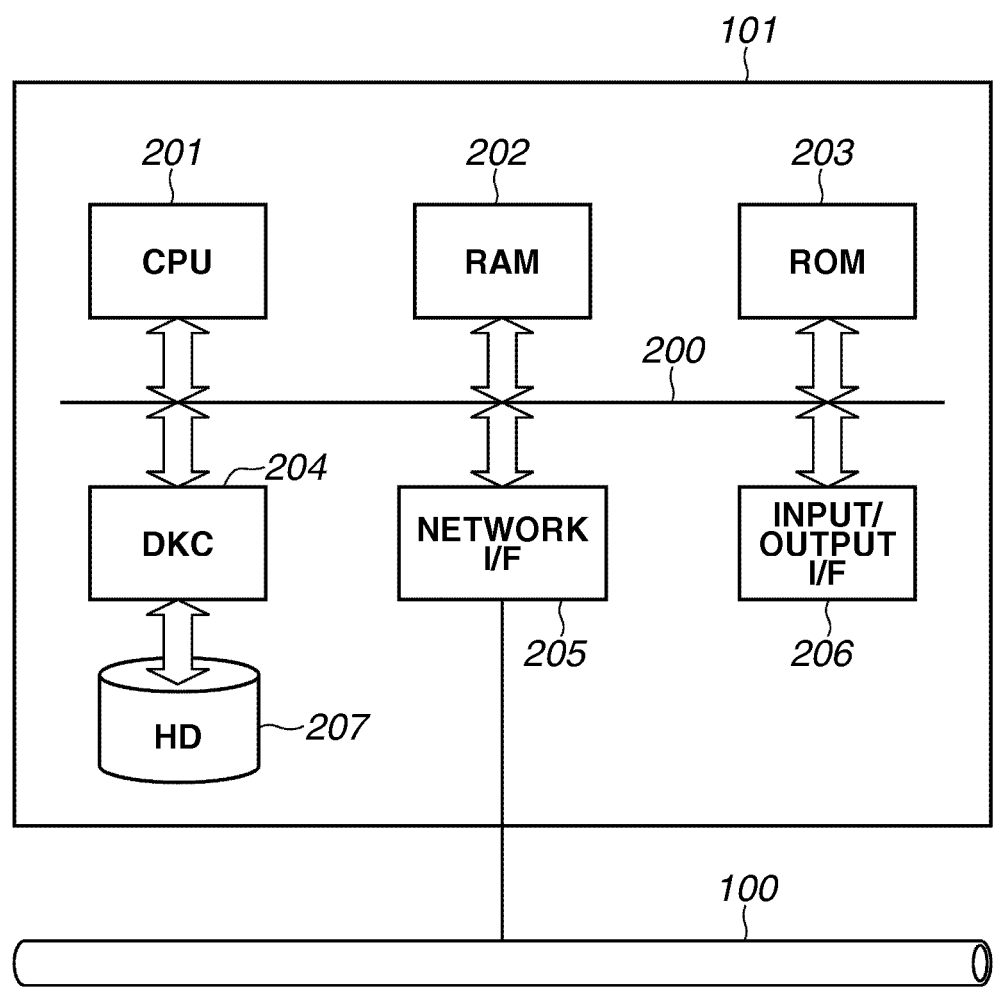
FIG. 2 illustrates a configuration of hardware of the network management apparatus according to the first exemplary embodiment of the present invention.

FIG. 2 illustrates a configuration of hardware of the network management apparatus 101. The network management apparatus 101 includes a system bus 200, a central processing unit (CPU) 201, random access memory (RAM) 202, a read only memory (ROM) 203, an external storage device control unit (DKC), a hard disk (HD) 207, and an input/output interface (I/F) 206.

The system bus 200 serves as a connection of each components included in a computer. The CPU 201 performs control of the entire computer and operation processing. The RAM 202 is a region where each program and data are loaded and executed for each processing. The ROM 203 is a region where a system starting program is stored.

The DKC 204 controls an external storage apparatus such as the HD 207. The HD 207 stores a program and data according to a flowchart described below and loads the program and the data to the HD 207 or the RAM 202 when executing as necessary. The network I/F 205 is connected to the network 100 to perform a network communication. The input/output I/F 206 is connected to a keyboard, a display, etc., to input/output data.

The network management apparatus 101 operates in a state where the CPU 201 is executing a basic Input/Output (I/O) program and an operating system (OS). The ROM 203 stores the basic I/O program, and the HD 207 stores the OS. When a power of a computer unit is turned on, the OS is written into the RAM 202 from the HD 207 to start an operation of the OS by an initial program loading function in the basic I/O program.

Figure 3:
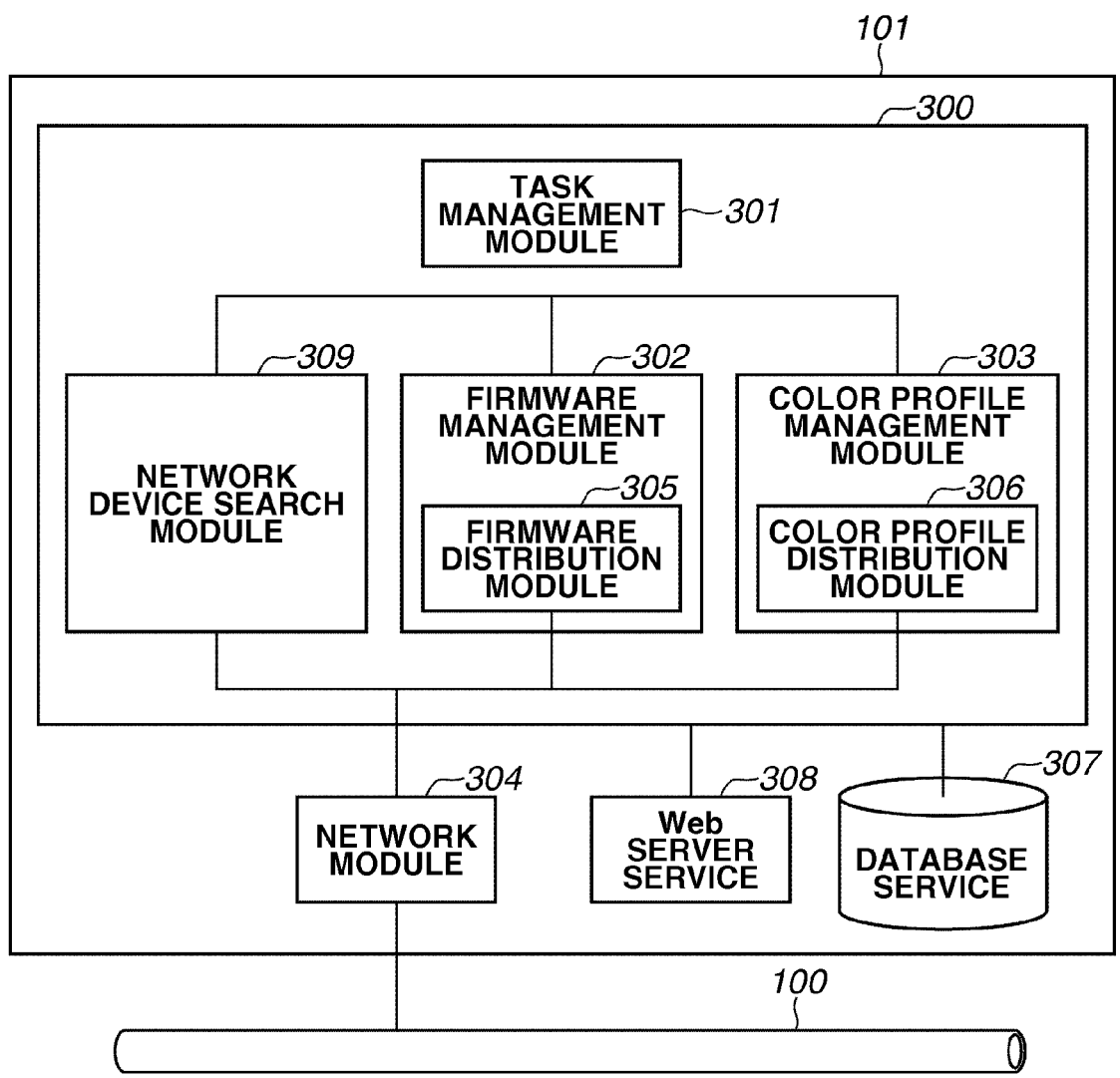
FIG. 3 illustrates a configuration of software of the network management apparatus according to the first exemplary embodiment of the present invention.

FIG. 3 illustrates a configuration of software of the network management apparatus 101. As illustrated in FIG. 3, a management utility 300 includes a task management module 301, a firmware management module 302, a color profile management module 303, a network module 304, a database service 307, a web server service 308, and a network device search module 309. The HD 207 stores a group of modules. The CPU 201 loads the group of modules to the HD 207 or the RAM 202 and executes the modules.

The HD 207 stores the management utility 300 as a program. The task management module 301 acquires task information registered by a user and stores the information into the database service 307. Further, when a specified time for executing a registered task comes, the task management module 301 acquires the task information from the database service 307. Furthermore, the task management module 301 invokes a firmware distribution module 305 and a color profile distribution module 306 to execute task processing.

The firmware management module 302 stores the firmware and firmware related information uploaded by the user into the HD 207 or the database service 307. The color profile management module 303 stores the color profile and the color profile related information uploaded by the user into the HD 207 or the database service 307.

The network module 304 communicates with the network device 102 via the network 100. The network device search module 309 searches the network device 102 connected thereto via the network using the network module 304. Regarding the searched network device 102, the network module 304 acquires setting information of the network device 102 and stores the setting information in the database service 307.

The firmware distribution module 305 acquires the firmware stored in the firmware management module 302 and distributes the firmware to the network device 102 using the network module 304. The color profile distribution module 306 acquires the color profile stored in the color profile management module 303 and distributes the color profile to the network device 102 using the network module 304.

The database service 307 manages data, and stores and takes out the data depending a request from other modules. As long as the database service 307 is accessible from the management utility 300, the database service 307 may be provided in a device different from the network management apparatus 101.

Upon receiving a GET request conforming to the Hyper Text Transfer Protocol (HTTP) from a web browser 600 of the client apparatus 103, the web server service 308 provides a service for returning web page data stored in the HD 207. The web server service 308 enables the user to connect to the network management apparatus 101 from an external apparatus via the network 100.

As described above, the web server service 308 and the management utility 300 are installed in the network management apparatus 101, which functions as a management apparatus by executing the web server service 308 and the management utility 300. The management utility 300 is mounted as, for example, a program for executing processing in response to a request of the web page provided by the web server service 308. As described above, the management utility 300 together with the web server service 308 realizes a web application for managing the network device 102.

Figure 4:
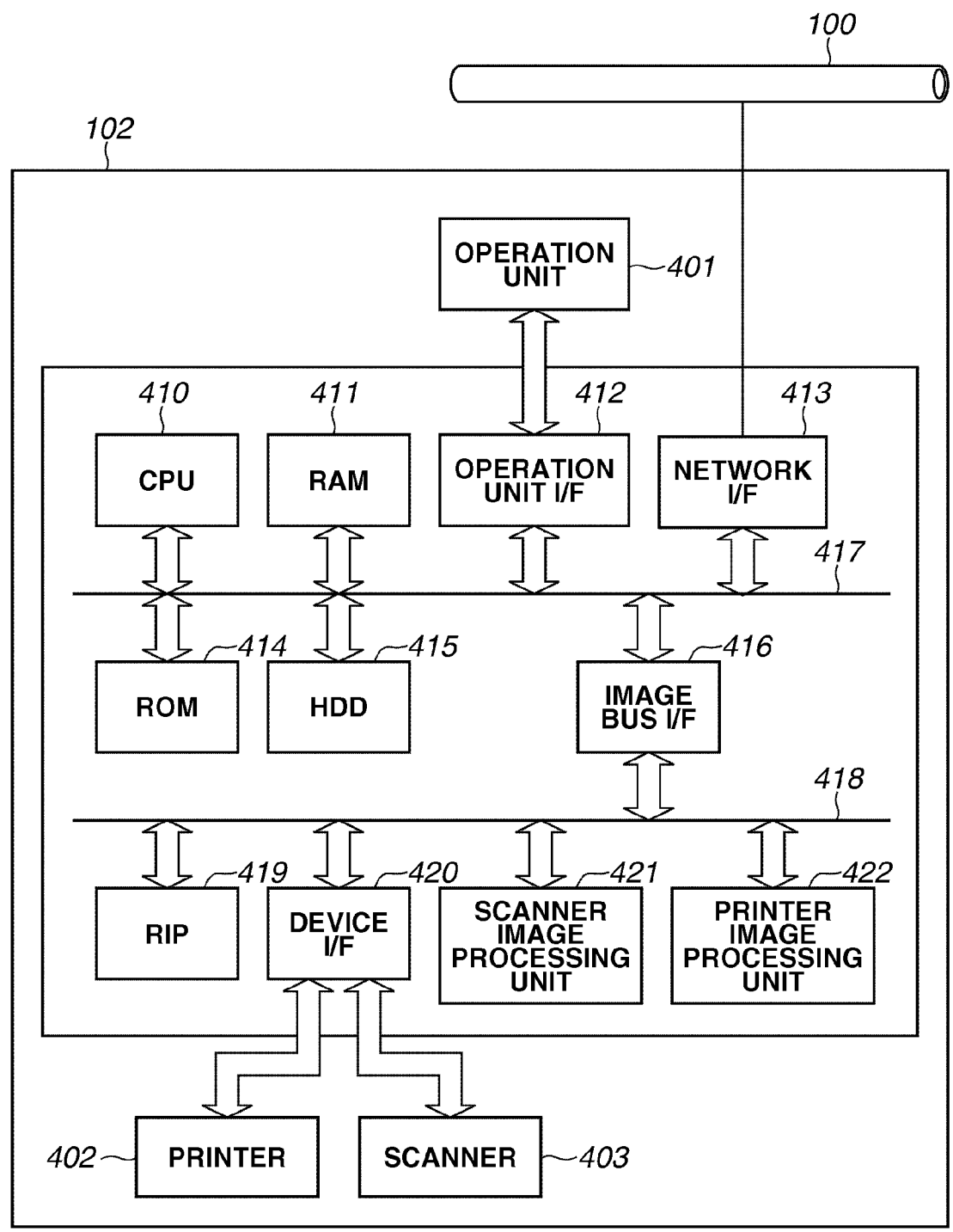
FIG. 4 illustrates a configuration of hardware of a network device according to the first exemplary embodiment of the present invention.

FIG. 4 illustrates a configuration of hardware of the network device 102. The network device 102 includes an operation unit 401, a printer 402, a scanner 403, and a control unit 400.

The control unit 400 includes a CPU 410, a RAM 411, an operation unit I/F 412, a network I/F 413, a ROM 414, a hard disk drive (HDD) 415, and an image bus I/F 416. The control unit 400 further includes a system bus 417, an image bus 418, a raster image processor (RIP) 419, a device I/F 420, a scanner image processing unit 421, and a printer image processing unit 422. Of the above configuration, the scanner 403 and the scanner image processing unit 421 are not essential.

The CPU 410 is a controller for controlling the entire control unit 400. The RAM 411 is a system work memory used for allowing the CPU 410 to operate. The RAM 411 is an image memory for temporarily storing image data. The operation unit I/F 412 serves as an interface between the user and the operation unit 401 and outputs to the operation unit 401 the image data to be displayed on the operation unit 401. Further, the operation unit I/F 412 transmits to the CPU 410 the information input by the user via the operation unit 401.

The network I/F 413 allows the user to connect to the network 100 and to input/output information to/from the network 100. The ROM 414 is a boot ROM, which stores a program for booting the system. The HDD 415 stores system software and the image data. The image bus I/F 416 is a bus bridge for connecting the system bus 417 and the image bus 418, which forwards the image data at high speed to convert a data structure.

The image bus 418 includes a Peripheral Component Interconnect (PCI) bus or IEEE 1394. The RIP 419 develops a page description language (PDL) command transmitted from the network 100 into a bit map image. The device I/F 420 connects the control unit 400 to the printer 402 or scanner 403, which is an image input/output device, and converts a synchronize synchronous/non-synchronous of the image data. The scanner image processing unit 421 performs correction, process, and edition on the input image data. The printer image processing unit 422 performs correction and conversion of resolution on print output image data depending on the performance of the printer 402.

Figure 5:
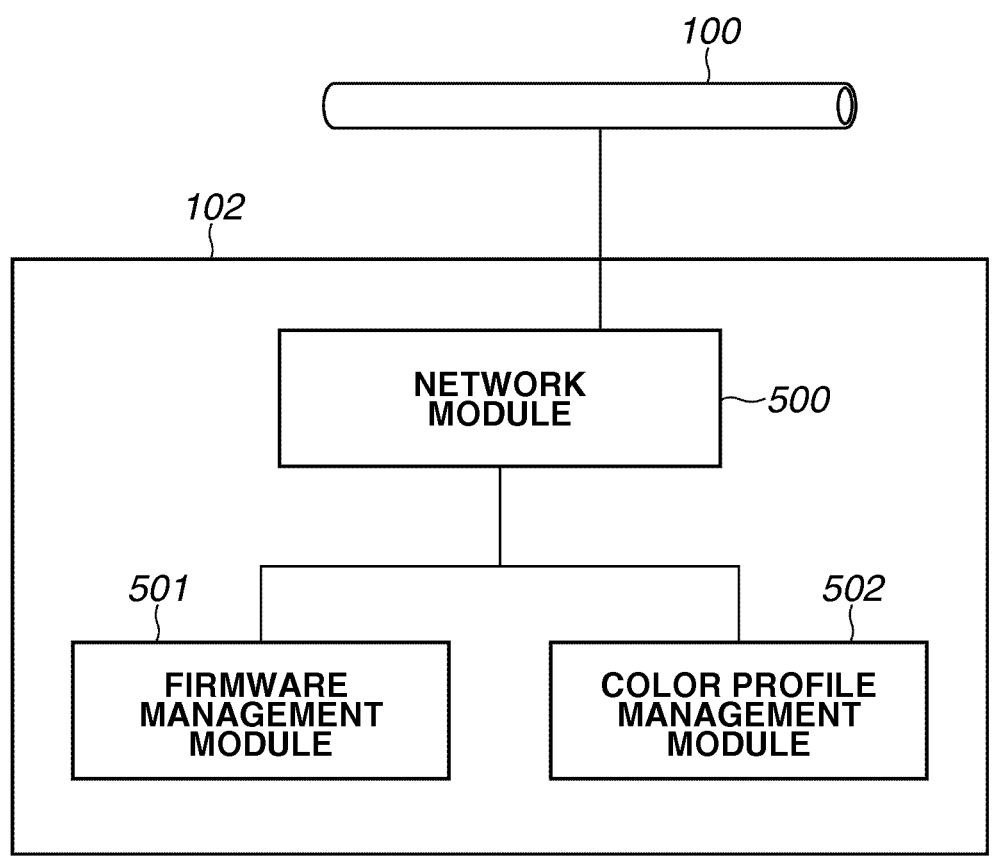
FIG. 5 illustrates a configuration of software of the network device according to the first exemplary embodiment of the present invention.

FIG. 5 illustrates a configuration of software of the network device 102. The software in the network device 102 includes a network module 500, a firmware management module 501, and a color profile management module 502. The HD 207 stores such a group of modules, which are loaded to the HD 207 or the RAM 202 and executed by the CPU 201.

The network module 500 receives the firmware or the color profile transmitted from the network management apparatus 101 via the network 100. The network module 500 determines the type of the received data. More specifically, the network module 500 transmits the received data to the firmware management module 501 when the received data is firmware and to the color profile management module 502 when the received data is a color profile.

The firmware management module 501 stores the received firmware in the HDD 415 and updates the firmware of the network device 102. The color profile management module 502 stores the received color profile in the HDD 415.

Hardware of the client apparatus 103 is a general-purpose computer, which has a configuration similar to that of the network management apparatus 101.

Figure 6:
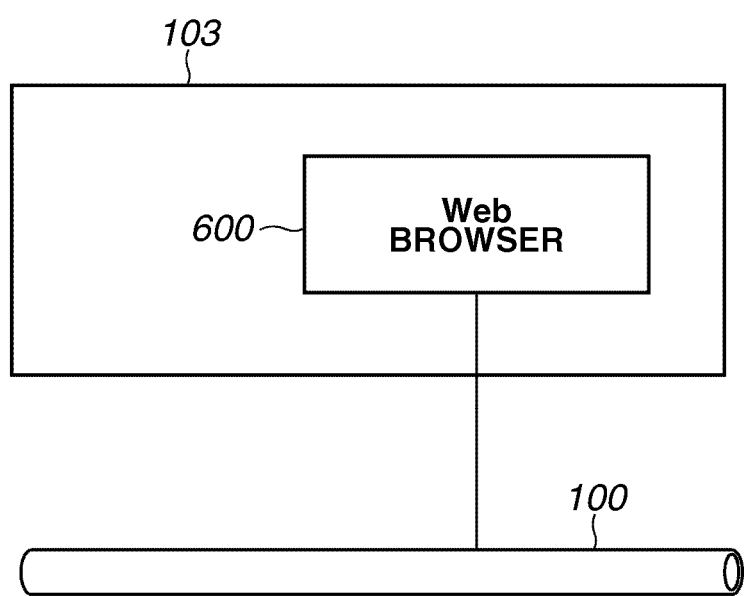
FIG. 6 illustrates a configuration of software of a client apparatus according to the first exemplary embodiment of the present invention.

FIG. 6 illustrate a configuration of software of the client apparatus 103. The software of the client apparatus 103 includes the web browser 600.

The HD 207 stores the web browser 600 as a program, which is stored in the RAM 202 on the OS and executed. When the user accesses the network management apparatus 101 from the client apparatus 103, the web browser 600 is used to connect the network management apparatus 101 and the client apparatus 103.

An operation of the network management apparatus 101 when the user registers the firmware, the firmware distribution task, and the color profile distribution task to the network management apparatus 101 will be described as follows.

It is supposed that a search for the network device 102 by the network management apparatus 101 has been previously completed and the user has registered the color profile to the network management apparatus 101.

Figure 7:
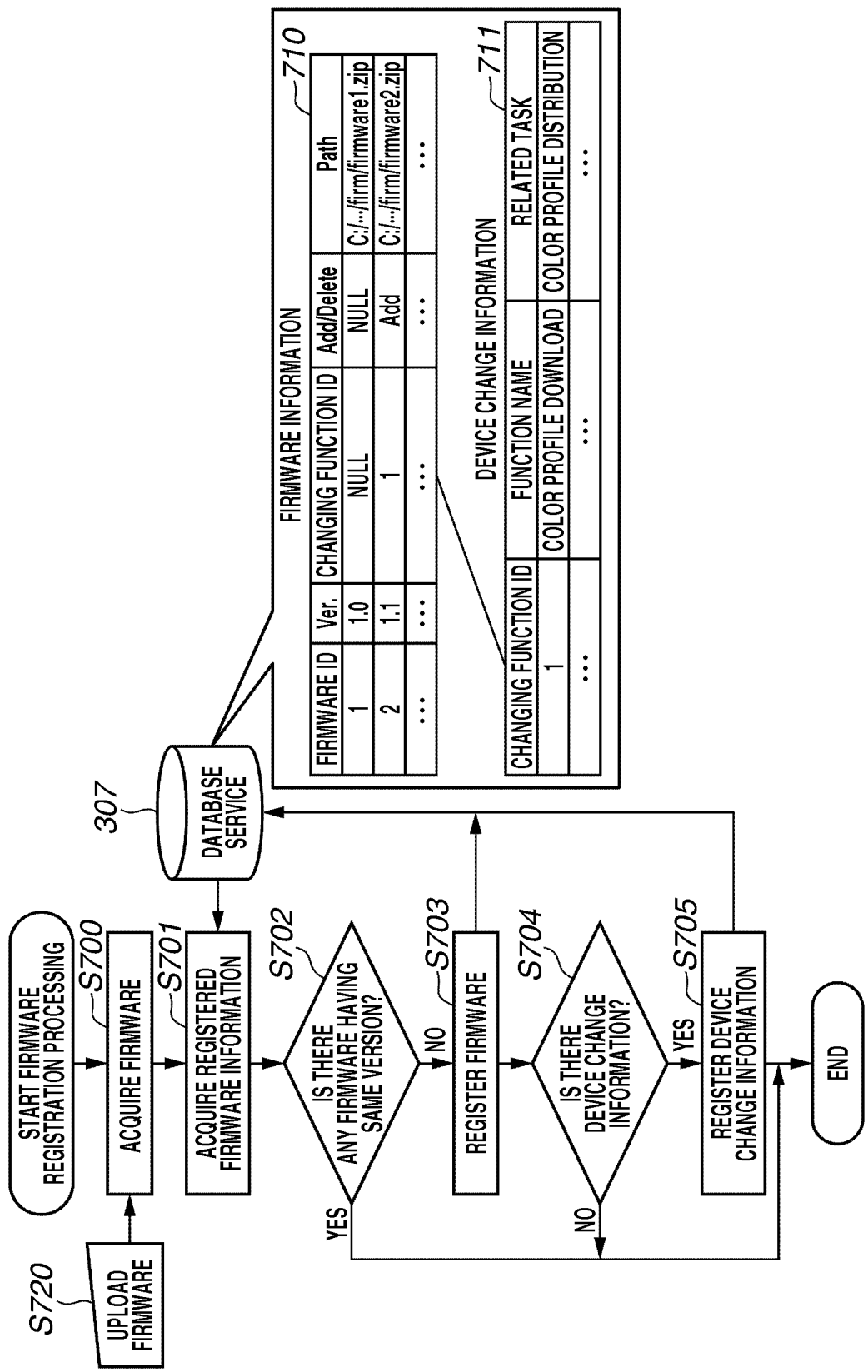
FIG. 7 illustrates an operation when firmware in the network management apparatus according to the first exemplary embodiment of the present invention is registered.

FIG. 7 illustrates an example of a flowchart of processing executed by the network management apparatus 101 when the user registers the firmware to the network management apparatus 101 from the client apparatus 103. The CPU 201 realizes processing illustrated in FIG. 7 by executing the firmware management module 302.

In step S700, the firmware management module 302 acquires the firmware uploaded by the user in step S720. At this time, if any, device change information is also acquired. A user interface when the firmware is registered in step S720 will be described below with reference to FIG. 8.

In step S701, the firmware management module 302 acquires the registered firmware information 710 from the database service 307. In step S702, the firmware management module 302 determines whether a firmware having the same version as that of the uploaded firmware has already been registered. If the firmware having the same version has been already registered (YES in step S702), the processing ends. If not registered yet (NO in step S702), the processing proceeds to step S703.

In step S703, the firmware management module 302 stores the acquired firmware in the HD 207 and the firmware information 710 in the database service 307. In step S704, the firmware management module 302 determines whether there is device change information on the stored firmware. If there is the device change information, then in step S705, the firmware management module 302 stores the device change information 711 in the database service 307. If not, the processing ends.

Figure 8:
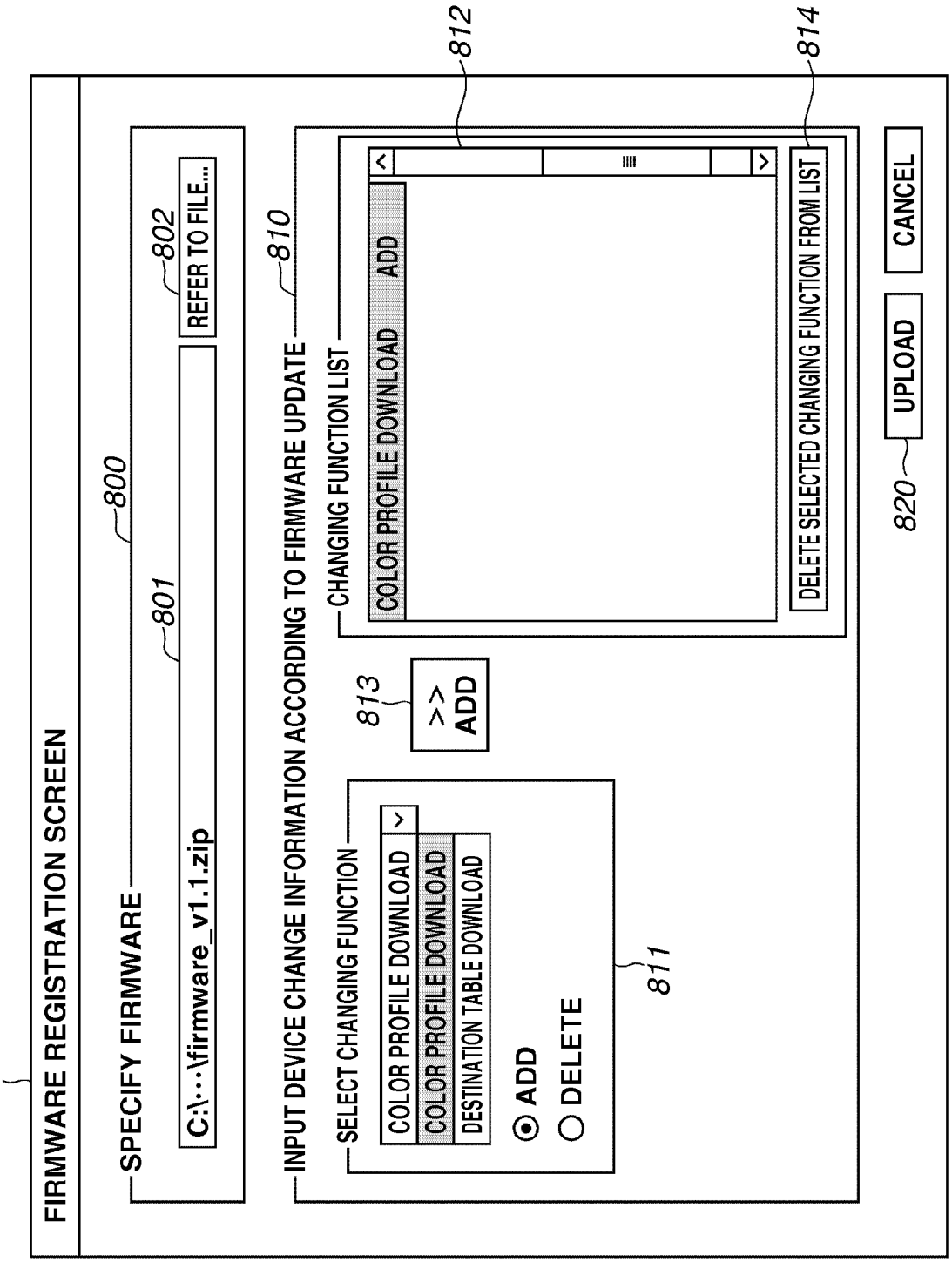
FIG. 8 illustrates an example of the firmware registration screen in the network management apparatus according to the first exemplary embodiment of the present invention.

FIG. 8 illustrates an example of a screen of the user interface for registering the firmware. The user specifies the firmware to be registered at a firmware specification field 800. When registering, the user may directly specify at a file path input unit field a file path of the firmware to registered, or may use a file reference button 802 to specify a file. The user inputs at a device change information input field 810 information on the device change that occurs when updating the firmware with use of the firmware to be registered.

The user selects a function to be changed according to firmware update and whether the function is changed to addition or deletion. When the user presses an addition button 813 with a function selection field 811 selected, the selected function additionally displayed at a device change information collective display field 812. When the user selects the displayed function at the device change information collective display field 812 and presses a deletion button 814, the selected function is deleted from the device change information collective display field 812. When the user presses an upload button 820, the specified firmware file and the input device change information are uploaded in the network management apparatus 101.

Figure 9:
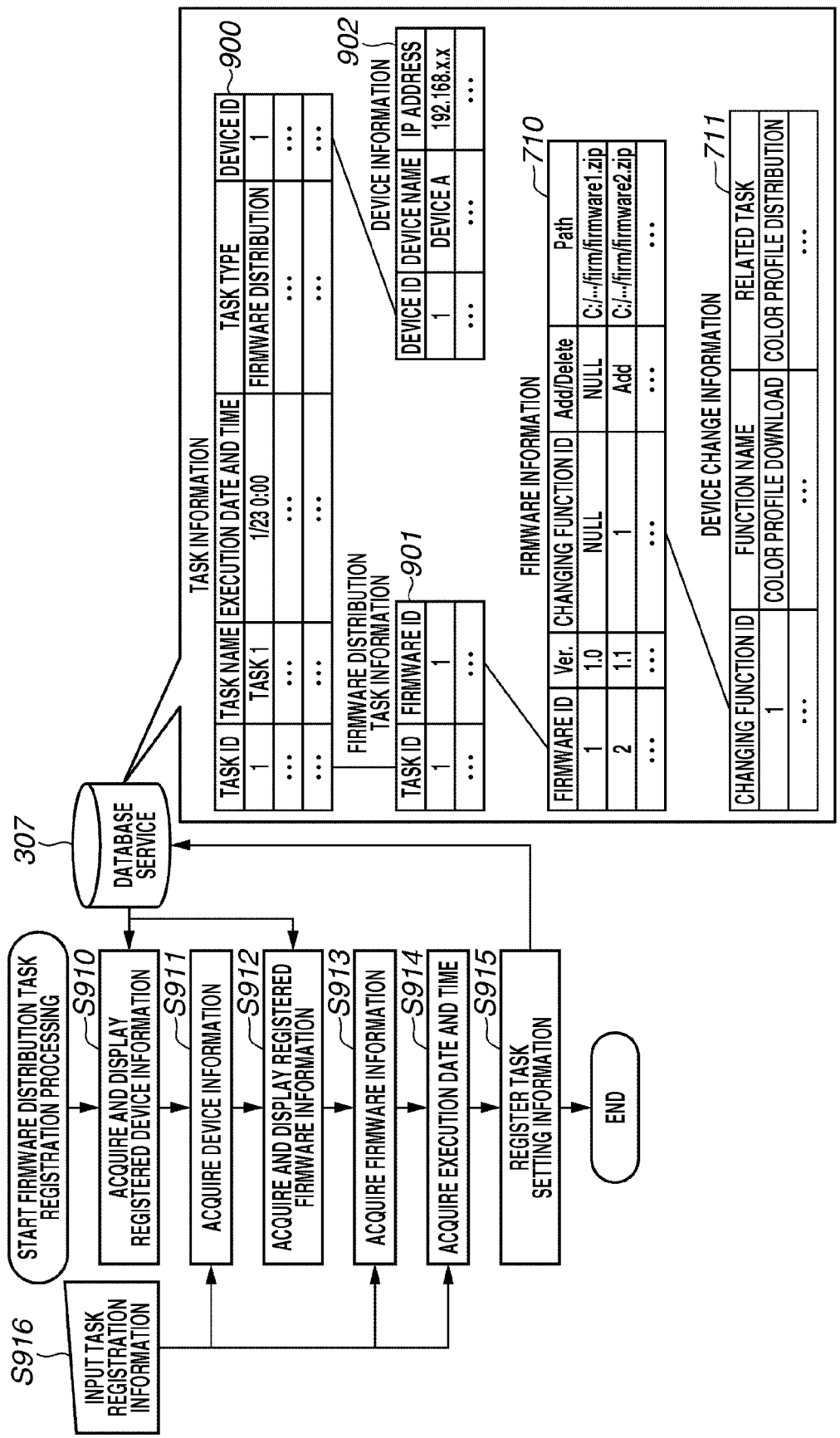
FIG. 9 illustrates an operation when a task for delivering firmware in the network management apparatus according to the first exemplary embodiment of the present invention is registered.

FIG. 9 illustrates an example of a flowchart of processing executed by the network management apparatus 101 when the firmware distribution task is registered. The CPU 201 realizes processing illustrated in FIG. 9 by executing the task management module 301.

In step S910, the task management module 301 acquires from the database service 307 device information 902 which has been previously searched and displays the device information 902 in a form in which the user can make a selection. In step S916, the user selects a target device from among displayed devices. In step S911, the network management apparatus 101 acquires information on the target device input by the user.

In step S912, the network management apparatus 101 acquires registered firmware information 710 from the database service 307 and displays the firmware information 710 in a form in which the user can make a selection. In step S916, the user selects target firmware from among the displayed pieces of firmware. In step S913, the network management apparatus 101 acquires the information of the firmware selected by the user.

In step S916, the user inputs an execution date and time. In step S914, the network management apparatus 101 acquires the execution date and time input by the user. In step S915, the network management apparatus 101 registers, to the database service 307 as firmware distribution task information 901, the device information, the firmware information, and the execution date and time that are selected by the user.

Figure 10:
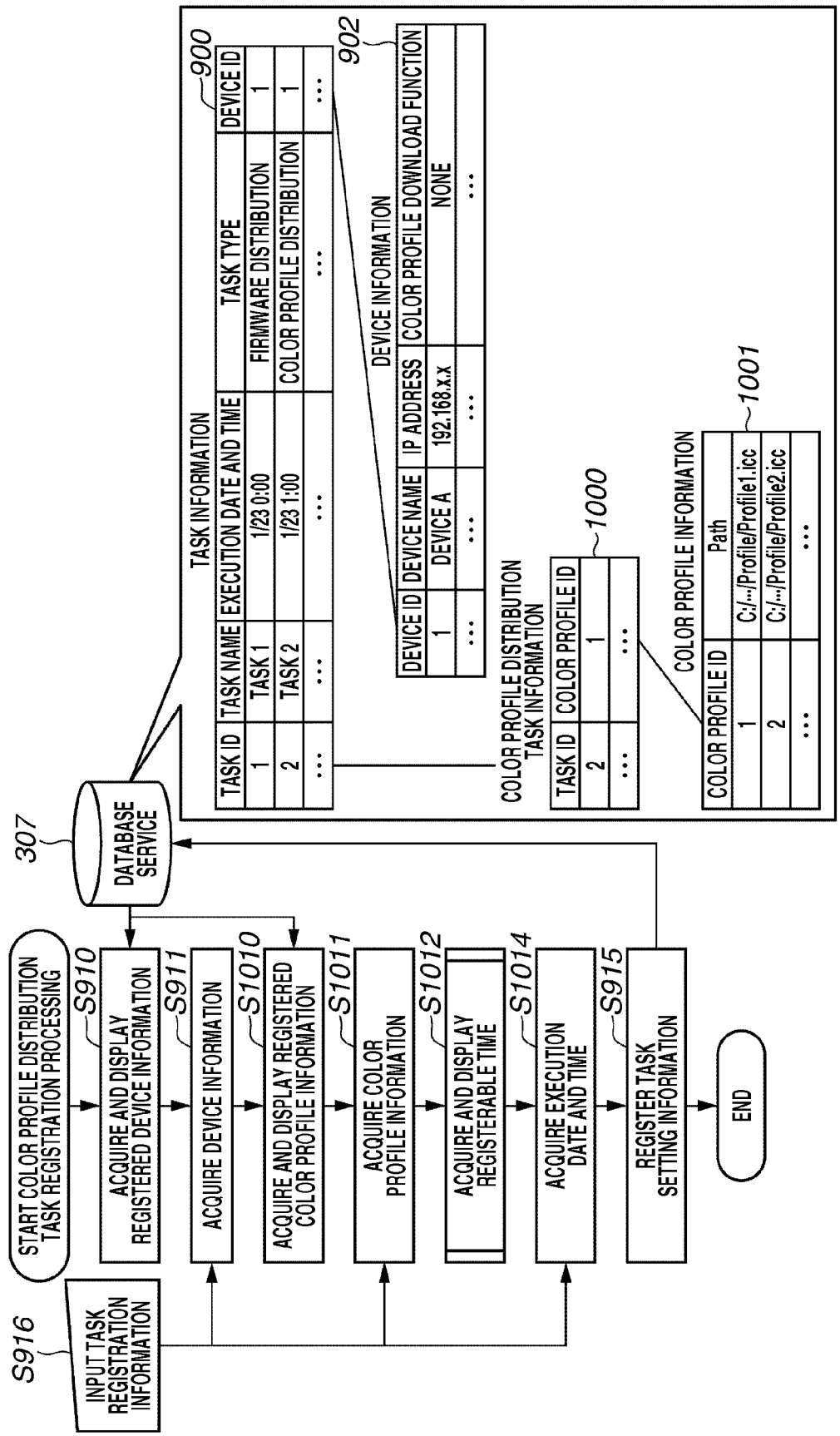
FIG. 10 illustrates an operation when a task for delivering a color profile in the network management apparatus according to the first exemplary embodiment of the present invention is registered.

FIG. 10 illustrates an example of a flowchart of processing executed by the network management apparatus 101 when a new task, for example, a task for distributing the color file, is registered. The CPU 207 realizes processing illustrated in FIG. 10 by executing the task management module 301.

In step S910, the task management module 301 acquires the registered device information 902 from the database service 307. In step S911, the task management module 301 acquires the information of the target device input by the user. So far, processing is similar to that when the firmware distribution task is registered.

In step S1010, the task management module 301 acquires registered color profile information 1001 from the database service 307 and displays it in a form in which the user can make a selection. In step S916, the user selects a target color profile from among displayed color profiles. In step S1011, the task management module 301 acquires color profile information selected by the user.

In step S1012, the task management module 301 acquires times which can be registered by the user and displays the times. In step S916, the user inputs an execution date and time from the displayed registerable times. In step S914, the task management module 301 acquires the execution date and time input by the user. Step S1012 will be described below with reference to FIG. 11. In step S915, the task management module 301 registers to the database service 307 the device information, the firmware information, the execution date and time that are selected by the user as the task information 900 and color profile distribution task information 1000.

Figure 11B:
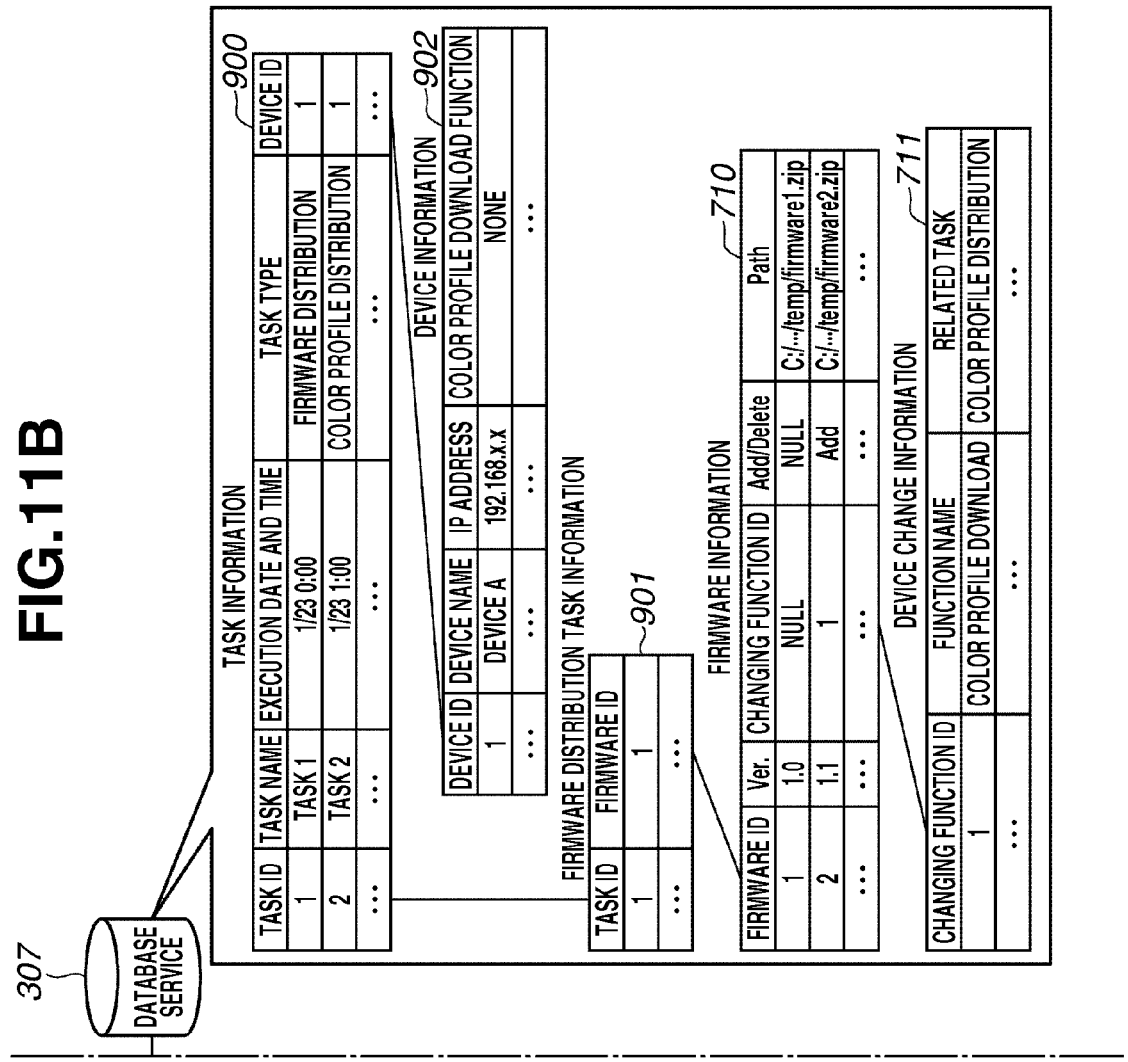
FIG. 11, which is composed of FIGS. 11A and 11B, illustrates an operation when a registerable time in the network management apparatus according to the first exemplary embodiment of the present invention is acquired.

FIG. 11 illustrates an example of a flowchart of processing executed by the network management apparatus 101 when registerable times of the new task are acquired and displayed (step S1012 in FIG. 10).

In step S1110, the task management module 301 acquires the registered task, for example, information on the firmware distribution task from the database service 307. The information on the registered task to be acquired includes the task information 900, the firmware distribution task information 901, the device information 902, the firmware information 710, and the device change information 711.

Subsequently, the task management module 301 executes the following processing on the registered task. In step S1111, the task management module 301 determines whether the target device of the firmware distribution task is the same as that of the color profile distribution task. The determination is made based on the task information 900. When the device is not the same (NO in step S1111), the processing proceeds to step S1117. When the device is the same (YES in step S1111), the processing proceeds to step S1112.

In step S1112, the task management module 301 determines whether there is any change of the function in the network device 102 when the firmware distribution task is executed. The determination is made based on the firmware distribution task information 901 and the firmware information 710. If there is no change of the function (NO in step S1112), the processing proceeds to step S1117. If there is any change of the function (YES in step S1112), the processing proceeds to step S1113.

In step S1113, the task management module 301 determines whether the change of the function accompanied by the execution of the registered task, which is the firmware distribution task, is related to the new task, which is the color profile distribution task. The determination is made based on the firmware distribution task information 901, firmware information 710, and the device change information 711.

If the change of the function is not related to the color profile distribution task (NO in step S1113), the processing proceeds to step S1117. If the change of the function is related to the color profile distribution task (YES in step S1113), the processing proceeds to step S1114. In steps S1111, S1112 and S1113, the task management module 301 determines whether the registered task accompanying the change of the function related to the execution of the new task exists in the network device.

In step S1114, the task management module 301 determines whether the change of the function accompanied by the execution of the firmware distribution task is an addition of the function. If the change of the function is the addition thereof (YES in step S1114), the processing proceeds to step S1116. If the change of the function is a deletion thereof (NO in step S1114), the processing proceeds to step S1115. If the processing proceeds to step S1115, the firmware distribution task is to delete the function related to the color profile distribution task. Therefore, the task management module 301 displays times earlier than the execution date and time of the firmware distribution task as the task registerable time.

On the other hand, if the processing proceeds to step S1116, the firmware distribution task is to add the function related to the color profile distribution task. Therefore, the task management module 301 displays times later than the execution date and time of the firmware distribution task as the task registerable time.

In step S1117, the task management module 301 determines whether the target device of the color profile distribution task has the color profile download function. The determination is made based on the task information 900 and the device information 902. If the target device has no download function, since the color profile distribution cannot be executed, the processing proceeds to step S1118, where the task management module 301 displays "Not registerable". Then, the processing ends.

In step S1117, if the target device has the download function, the processing proceeds to step S1119, where the task management module 301 displays all times later than the time when the task has been registered as the registerable time.

In each of steps S1115, S1116, S1118 and S1119, the task management module 301 specifies the registerable time of the new task to the device, accepts registration of the new task executed at the time, and does not accept the registration of the new task executed at other than the time. In other words, the task management module 301 registers the new task such that the new task can be executed after the related registered task has been executed.

According to the first exemplary embodiment, a function check for determining whether each device can be registered is not performed when the registered device information is displayed in step S910. However, the function check is performed only on the task target device when the registerable time is acquired in step S1012. If the registerable device is to be previously searched, then in step S910, it may be determined whether each device can be registered based on the task information 900 and the device information 902.

Figure 12:
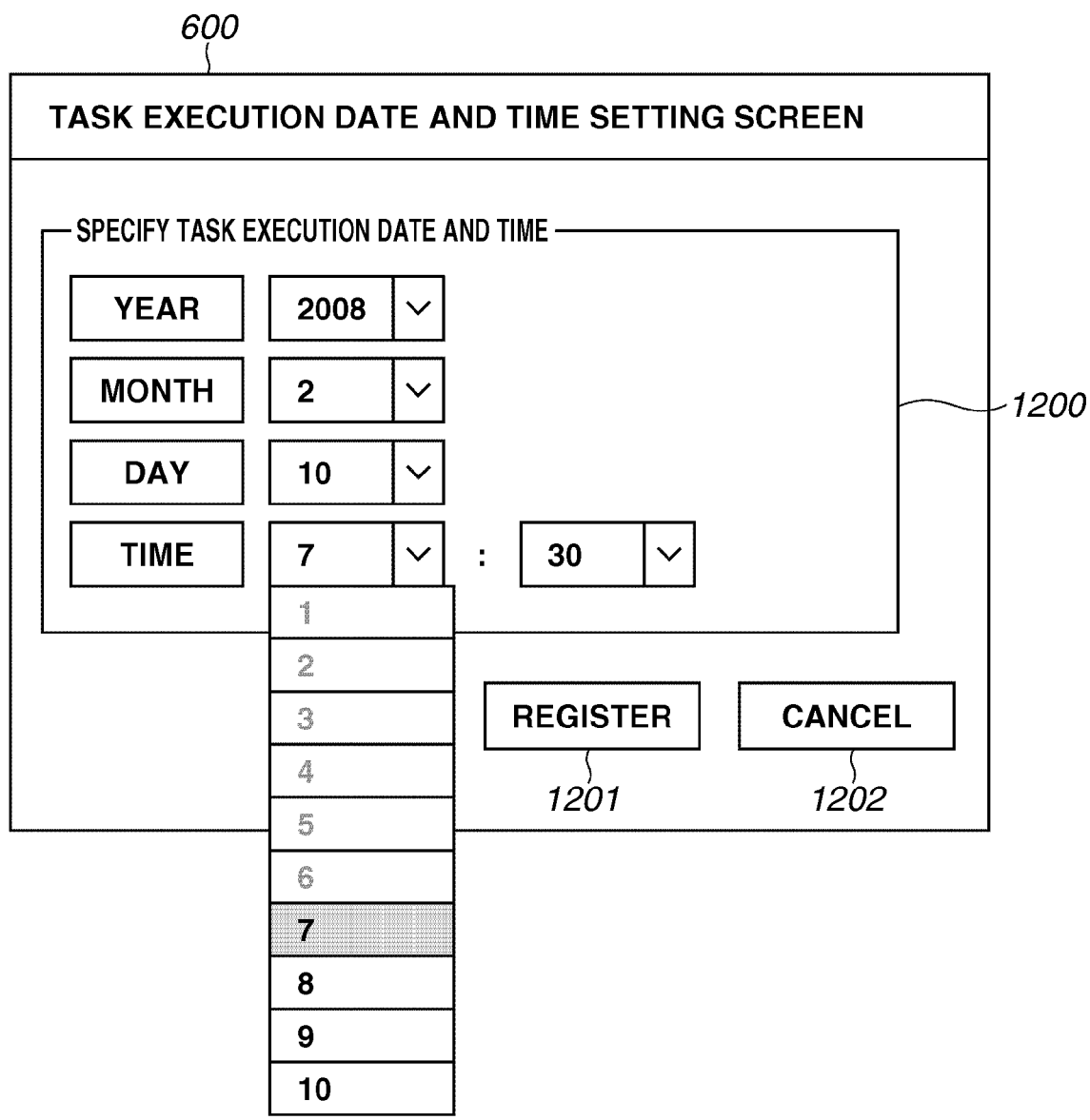
FIG. 12 illustrates an example of a screen for setting a task execution date and time in the network management apparatus according to the first exemplary embodiment of the present invention

FIG. 12 illustrates an example of a setting screen for setting the task execution date and time. In FIG. 12, the firmware distribution task accompanying the addition of the function executed at 6:00 on Feb. 10, 2008 is registered. More specifically, the network device 102 has no color profile download function before the firmware is distributed at 6:00 on Feb. 10, 2008. The color profile download function is added to the network device 102 by the firmware distribution at 6:00 on Feb. 10, 2008.

A execution date and time specification field 1200 is a region where the user specifies the execution date and time of the task. The network device 102 has no color profile download function before 6:00 on Feb. 10, 2008. Thus, when the function to be added, which is the task related to the color profile download function, is registered at Feb. 9, 2008, a time earlier than 6:00 on Feb. 10, 2008 cannot be selected as the execution date and time of the color profile distribution task.

When a registration button 1201 is pressed, the task having the time input at the execution date and time specification field 1200 as the execution date and time is registered. A cancel button 1202 stops a task registration operation when pressed.

According to the task information registered as described above, the task management module 301 in the network management apparatus 101 executes the firmware distribution module 305 at the execution date and time to execute distribution of the firmware. Similarly, the task management module 301 executes the color profile distribution module 305 at the execution date and time to execute the distribution of the firmware.

In the network device 102, the network module 500 receives the firmware and the color profile transmitted from the network management apparatus 101. When received data is the firmware, the network module 500 transmits the data to the firmware management module 501. When the received data is the color profile, the network module 500 transmits the data to the color profile management module 502.

The firmware management module 501 stores the received firmware in the HDD 415 and updates the firmware of the network device 102. The color profile management module 502 stores the received color profile in the HDD 415.

As described above, according to the first exemplary embodiment, considering the registered task, for example the addition/deletion of the function to/from the network device 102 by execution of the firmware distribution task, the new task, for example color profile distribution task can generated.

Therefore, the new task that cannot be conventionally registered until the function is added to the network device can be previously registered by executing another registered task. When another registered task is executed, the function may be deleted from the network device. The new task that may fail to be executed due to the deletion can be prevented from being erroneously registered.

According to the first exemplary embodiment, when the task is registered, the target device selection, the distribution target (color profile or firmware) selection, and the specification of the execution date and time are set in this order. According to the present exemplary embodiment, when the task is registered, the setting may be performed the other way around. According to a second exemplary embodiment of the present invention, the setting order for registering the task is firstly to specify the distribution target and the execution date and time, and lastly to select the target device.

In the second exemplary embodiment, since the entire configuration of the network management system, the configurations of hardware and software of the network management apparatus 101, the network device 102, and the client apparatus 103 are similar to those of the first exemplary embodiment, a detailed description thereof will not be repeated. When the firmware is registered and when the firmware distribution task is registered, since the operation of the network management apparatus 101 is similar to that of the first exemplary embodiment, a description thereof will not be repeated.

FIG. 13 illustrates an example of a flowchart of processing executed by the network management apparatus 101 when a new task, for example, a task for distributing a color profile, is registered according to the second exemplary embodiment. The CPU 201 realizes the processing illustrated in FIG. 13 by loading and executing the task management module 301.

Firstly, in step S1010, the task management module 301 acquires the registered color profile information 1001 from the database service 307 and displays the color profile information 1001 in a form in which the user can make a selection. In step S1011, the task management module 301 acquires the color profile information selected by the user. In step S914, the task management module 301 acquires the execution date and time input by the user. Since a task execution target device has not been set yet, a limitation for the execution date and time that can be specified is not provided unlike the first exemplary embodiment.

Subsequently, in step S1300, the task management module 301 acquires and displays the device information which can be registered by the user based on the execution date and time set by the user. Details of step S1300 will be described with reference to FIG. 14. Subsequently, in step S911, the task management module 301 acquires the device information of the device selected by the user. Then, in step S915, the task management module 301 registers the task information.

Figure 14B:
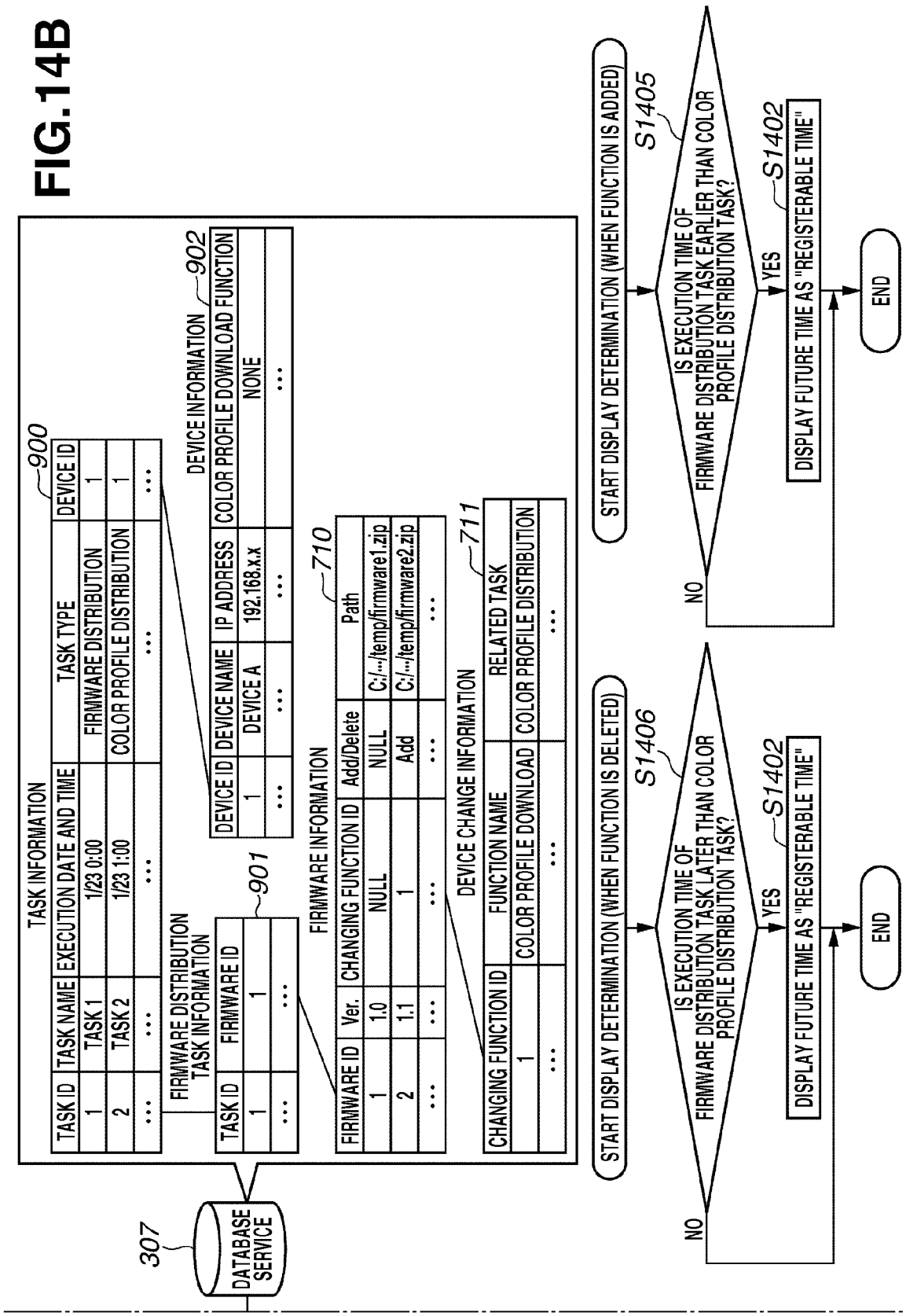
FIG. 14, which is composed of FIGS. 14A and 14B, illustrates an operation when registerable device information is acquired by the network management apparatus according to the second exemplary embodiment of the present invention.

FIG. 14 illustrates an example of a flowchart of processing executed by the network management apparatus 101 when the information of the registerable device is acquired.

In step S1400, the task management module 301 acquires the registered device information 902 from the database service 307. Then, the task management module 301 performs the following processing on each device of the acquired device information 902 to determine whether each device is displayed as a selectable device.

In step S1110, the task management module 301 acquires the registered firmware distribution task information 901 from the database service 307. In step S1401, the task management module 301 determines whether the acquired firmware distribution task information 901 has a task including the same execution target device as the currently selected device. The determination is made based on the firmware distribution task information 901 and the task information 900.

In step S1401, if the firmware distribution task targeting the same device is not registered (NO in step S1401), the processing proceeds to step S1117. In step S1401, if the firmware distribution task targeting the same device is registered (YES in step S1401), the processing proceeds to step S1112.

In step S1112, the task management module 301 determines whether the firmware distribution task has the change function based on the firmware distribution task information 901 and the firmware information 710. In step S1112, if the firmware distribution task has no change function (NO in step S1112), the processing proceeds to step S1117. If the firmware distribution task has the change function (YES in step S1112), the processing proceeds to step S1113.

In step S1113, the task management module 301 determines whether the change function of the firmware distribution task is related to the new task, which is the color profile distribution task. The determination is made based on the firmware distribution task information 901, the firmware information 710, and the device change information 711. In step S1113, if the change function is not related to the color profile distribution task (NO in step S1113), the process proceeds to step S1117. If the change function is related to the color profile distribution task (YES in step S1113), the processing proceeds to step S1114.

In steps S1401, S1112, and S1113, the task management module 301 determines whether the registered task accompanying the change of the function related to the execution of the new task on the network device exists.

In step S1114, the task management module 301 determines whether the change of the function by the execution of the firmware distribution task is the addition. If the change is the addition (YES in step S1114), the processing proceeds to step S1404. If the change is the deletion (NO in step S1114), the processing proceeds to step S1403. In steps S1403 and S1404, the task management module 301 determines whether to display each device as the registered device.

When the function is deleted by the execution of the firmware distribution task, the processing proceeds to step S1406. In step S1406, the task management module 301 determines whether the execution date and time of the firmware distribution task is later than that of the color profile distribution task. If the execution date and time of the firmware distribution task is later than that of the color profile distribution task (YES in step S1406), then in step S1402, the task management module 301 displays the selected device as the registerable device. In step S1406, the firmware distribution task is earlier than that of the color profile distribution task (NO in step S1406), the task management module 301 displays no device as the registerable device.

When the function is added by the execution of the firmware distribution task, the processing proceeds to step S1405. When the function is deleted by the execution of the firmware distribution task, the function of the addition can be used only before the execution.

In step S1405, the task management module 301 determines whether the execution date and time of the firmware distribution task is earlier than that of the color profile distribution task. If the execution date and time is earlier than that of the color profile distribution task (YES in step S1405), then in step S1402, the task management module 301 displays the selected device as the registerable device. If the execution date and time is later than that of the color profile distribution task (NO in step S1405), the task management module 301 displays no device as the registerable device.

In step S1117, the task management module 301 determines whether the selected device has the color profile download function based on the device information 902. If the selected device has the color profile download function (YES in step S1117), then in step S1402, the task management module 301 displays the selected device as the registerable device. On the other hand, the selected device does not have the download function (NO in step S1117), the task management module 301 displays no device as the registerable device.

In steps S1403 and S1404, the task management module 301 specifies the executable time of the new task, accepts the registration of the new task executed at the time, and does not accept the registration of the new task executed at other than the time. In other words, the task management module 301 registers the new task such that the new task can be executed after the related registered task has been executed.

FIG. 15 illustrates an example of a screen for selecting the target device. In FIG. 15, a selectable device display field 1500 displays a network device 102 that is a task execution target. The user selects and checks the network device 102 that is the task execution target, and sets the network device 102 as the task target device by pressing a setting button 1503.

By pressing an all-select button 1501, all of the network devices 102 displayed at the selectable device display field 1500 can be selected. By pressing an all-cancel button 1502, the selection of all of the network devices 102 displayed at the selectable device display field 1500 can be canceled.

In the example illustrated in FIG. 15, the selectable device display field 1500 displays three network devices 102, which are Device 1, Device 2, and Device 3. All of Device 1, Device 2, and Device 3 have no color profile download function when the task is registered. Presume that the firmware distribution task for adding the color profile download function only to Device 1 and Device 2 is registered. The firmware distribution task is not registered to Device 3. Further, presume that the execution date and time of the registered firmware distribution task is earlier than that of the color profile distribution task that is being generated.

In this case, since the color profile download function is added to Device 1 and Device 2 by the execution of the firmware distribution task earlier than the execution date and time, the selectable device display field 1500 illustrated in FIG. 15 displays Device 1 and Device 2 in a normal color so that the user can make a selection thereof. On the other hand, since the color profile download function is not to be added to Device 3, the selectable device display field 1500 displays Device 3 in gray so that the user cannot make a selection thereof. As described above, according to the registered task information, the task management module 301 of the network management apparatus 101 executes the firmware distribution module 305 at the execution date and time to execute distribution of the firmware.

As described above, according to the second exemplary embodiment, considering a state of the network device 102 when the task is executed, the network management apparatus 101 displays the target device selection screen when the task is registered. Therefore, by executing another registered task, the new task that cannot be conventionally registered until the function is added to the network device can be registered without error. When another registered task is executed, the function may be deleted from the network device. The new task that may fail to be executed due to the deletion can be prevented from being erroneously registered.

According to the first and second exemplary embodiments, the user specifies the execution data and time when the new task is registered. However, according to the present exemplary embodiment, the user does not have to specify the execution date and time but the network management apparatus 101 may automatically set the execution date and time within a predetermined time. According to a third exemplary embodiment of the present invention, the network management apparatus 101 automatically schedules the execution date and time of the new task within a predetermined time.

In the third exemplary embodiment, since the entire configuration of the network management system and the configurations of hardware and software of the network management apparatus 101, the network device 102, and the client apparatus 103 are similar to those of the first exemplary embodiment, a detailed description thereof will not be repeated. When the firmware is registered and when the firmware distribution task is registered, since the operation of the network management apparatus 101 is similar to that of the first exemplary embodiment, a description thereof will not be repeated.

Figure 16:
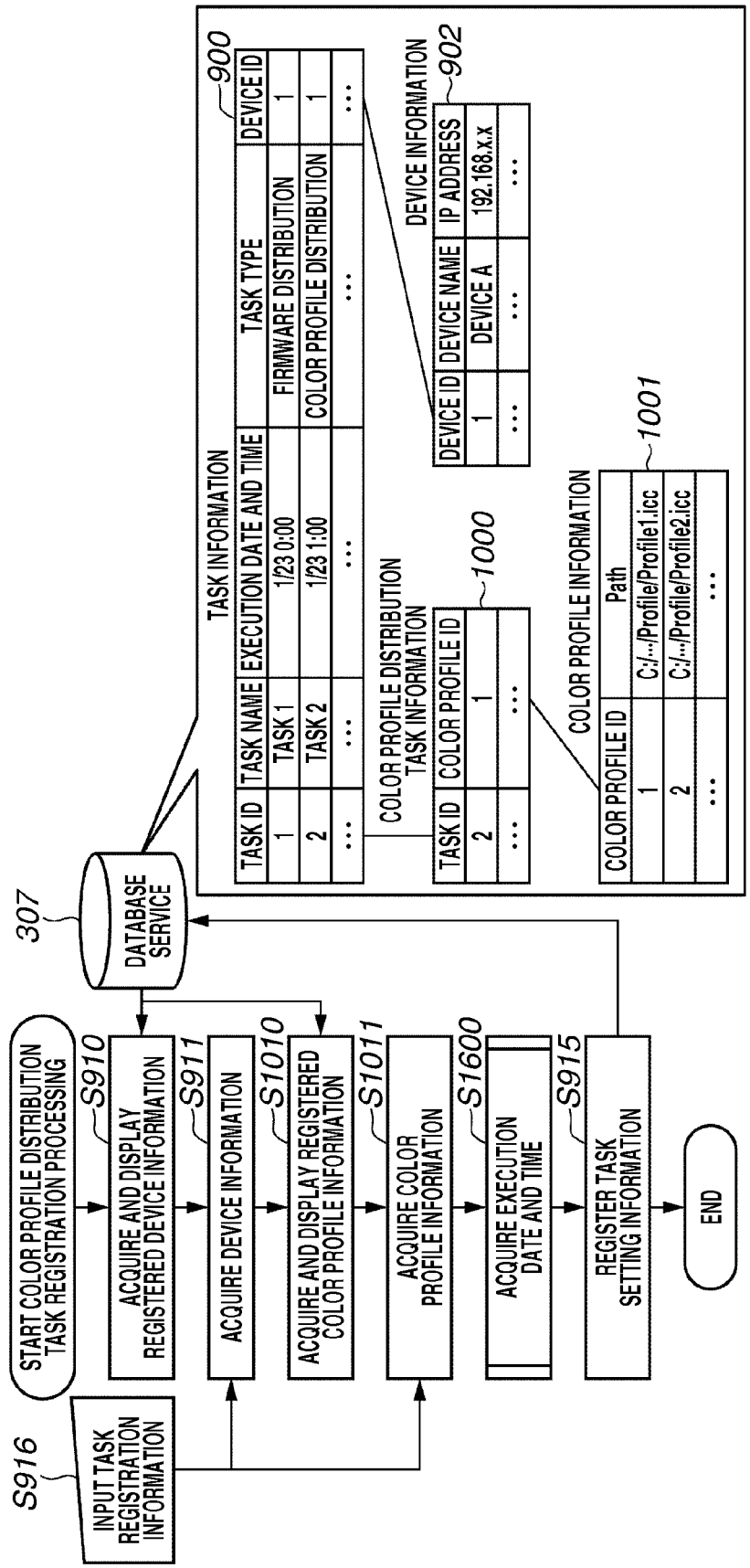
FIG. 16 illustrates an operation when a task for delivering a color profile is registered by a network management apparatus according to a third exemplary embodiment of the present invention.

FIG. 16 illustrates an example of a flowchart of processing executed by the network management apparatus 101 when the color profile distribution task, which is a new task, is generated. In FIG. 16, the processing of steps S910, S911, S1010, and S1011 is similar to that of the first exemplary embodiment. In step S1600, the network management apparatus 101 acquires the execution date and time. Processing in subsequent step S915 is similar to that of the first exemplary embodiment.

Figure 17B:
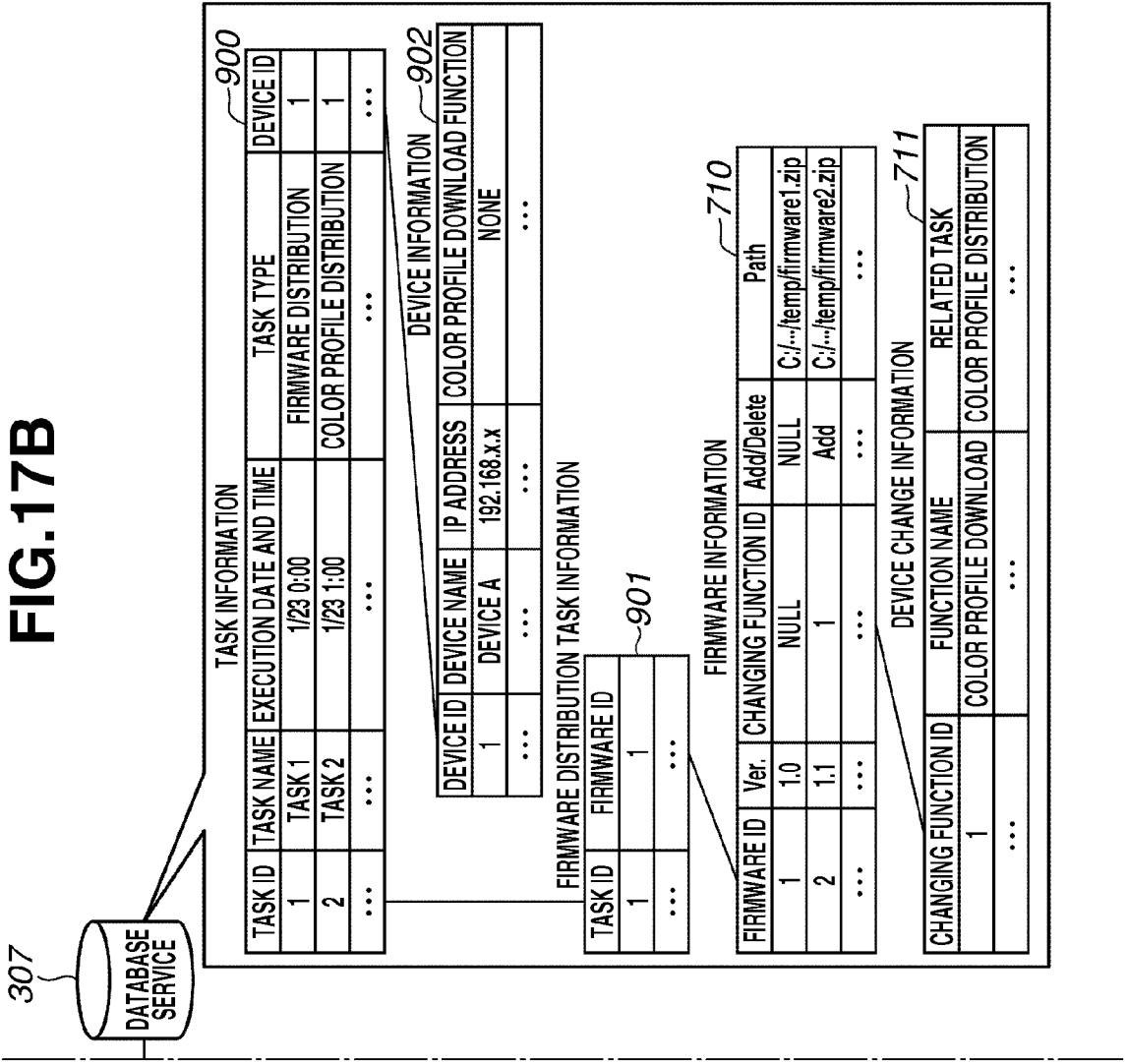
FIG. 17, which is composed of FIGS. 17A and 17B, illustrates an operation when an execution date and time is registered by the network management apparatus according to the third exemplary embodiment of the present invention.

FIG. 17 illustrates a detailed flow of processing in step S1600. Since the steps other than steps S1700, S1701, and S1702 are similar to those of the first exemplary embodiment, a description thereof will not be repeated.

In FIG. 17, since the processing in steps S1110, S1111, S1112, S1113, S1114 and S1117 are similar to those of the first exemplary embodiment illustrated in FIG. 11, a detailed description thereof will not be repeated. The task management module 301 in steps S1111, S1112, and S1113 determines whether the registered task accompanying the change of the function related to the execution of the new task on the network device exists.

In step S1117, the task management module 301 determines whether the target device of the color profile distribution task has the color profile download function. If the color profile distribution task has the color profile download function (YES in step S1117), then in step S1700, the task management module 301 acquires a current time as the execution date and time. More specifically, the task management module 301 registers the task as executable right away.

According to the first exemplary embodiment, in step S1119 illustrated in FIG. 11, when the target device has the color profile download function, the time later than the registration date and time of the task is displayed as the registerable time. The third exemplary embodiment is different from the first exemplary embodiment in that the task is registered in step S1117 as executable right away.

In step S1114, the task management module 301 determines whether the change of the function by the execution of the firmware distribution task is the addition of the function. If the change is the addition (YES in step S1114), the processing proceeds to step S1702. If the change is the deletion (NO in step S1114), the processing proceeds to step S1701. In step S1701, the task management module 301 acquires the time right before the execution date and time of the firmware distribution task as the execution date and time. In step S1702, the task management module 301 acquires the time right after the execution date and time of the firmware distribution task as the execution date and time.

According to the first exemplary embodiment, in steps S1115 and S1116 illustrated in FIG. 11, each registerable time is displayed. In steps S1701 and S1702 illustrated in FIG. 17, the third exemplary embodiment is different from the first exemplary embodiment in that the time right before or right after of the execution date and time of the task is displayed. Considering the time necessary for distributing the firmware, the interval of the execution date and time between the firmware distribution task and the color profile distribution task is set at a previously-set arbitrary value.

In steps S1700, S1701, and S1702, the task management module 301 specifies the executable time of the new task on the device, accepts the registration of the new task executed at the time, and does not accept the registration of the new task executed at other than the time. According to the third exemplary embodiment, a time for executing the task is automatically set within an executable time of the new task.

Figure 18:
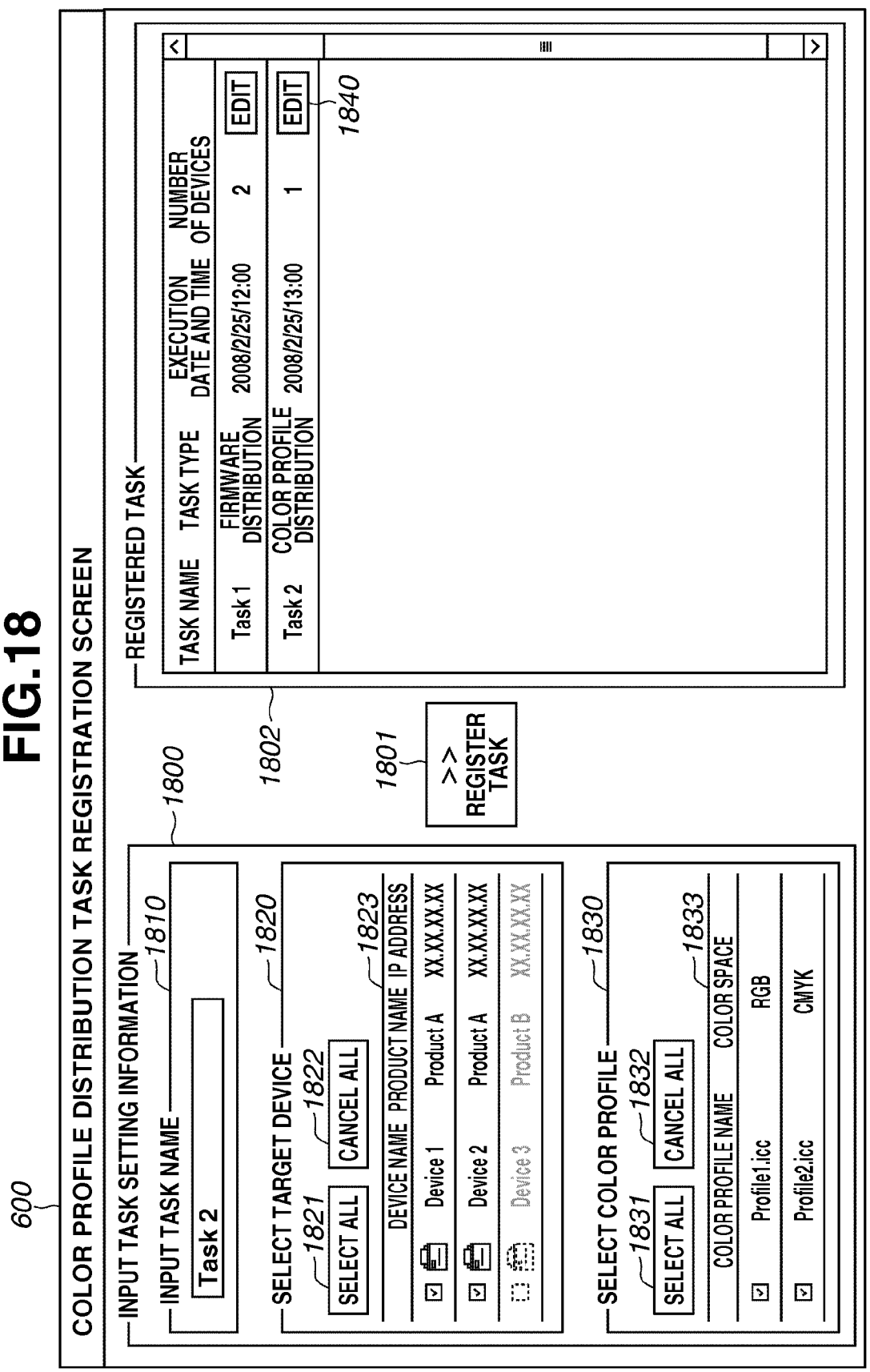
FIG. 18 illustrates an example of a screen for registering a task for delivering the color profile in the network management apparatus according to the third exemplary embodiment of the present invention.

FIG. 18 illustrates an example of a screen for registering the task. The user inputs information on the task to be registered in a task setting information field 1800. After inputting the information on the task setting in the task setting information field 1800, the user presses a task registration button 1801. The task having the input setting information is registered and is displayed at a registered task display field 1802.

An edit button 1840 is displayed for each task at the registered task display field 1802. The user can edit the execution date and time later. Since FIG. 18 illustrates a screen for registering the color profile distribution task, the firmware distribution task is displayed in gray and cannot be edited.

The task setting information input field 1800 includes the task name input field 1810, a target device selection field 1820, and a color profile selection field 1830. The user inputs a name of the task to be registered in the task name input field 1810. The target device selection field 1820 includes an all-select button 1821, an all-cancel button 1822, and a selectable device display field 1823.

A list of registered network devices 102 is displayed at a selectable device display field 1823 on the network management apparatus 101. The user can select the task execution target device from the displayed list of network devices 102. When the all-select button 1821 is pressed, all of the network devices 102 displayed in the list in the selectable device display field 1823 are selected. When the all-cancel button 1822 is pressed, the selection of all of the network devices 102 selected at the selectable device display field 1823 is canceled.

A color profile selection field 1830 includes an all-select button 1831, an all-cancel button 1832, and a selectable color profile display field 1833. The selectable color profile display field 1833 displays a list of color profiles registered by the user to the network management apparatus 101. The user can select the color profile of the distribution target from the displayed list of color profiles. When the all-select button 1831 is pressed, all of the color profiles displayed at the selectable color profile display field 1833 are selected. When the all-cancel button 1832 is pressed, the selection of all of the selected color profiles at the selectable color profile display field 1833 is canceled.

As described above, according to the registered task information, the task management module 301 of the network management apparatus 101 executes the firmware distribution module 305 at the execution date and time to execute the distribution of the firmware.

As described above, according to the third exemplary embodiment, the task management module 301 automatically registers the new task such that the new task is executed after the related registered task has been executed. The user can readily register the task only by selecting the target device and the target color profile. Considering an effect by the execution of the registered firmware distribution task, the color profile distribution task, which is automatically scheduled, is registered to the network management apparatus 101. Therefore, the user can register the new task by a simple operation while considering the change of the function of the registered task.

In the first, second, and third exemplary embodiments, a case where the color profile is distributed from the network management apparatus 101 to the network device 102 is described. However, the case is not limited to the one described in the exemplary embodiments, and the device setting information and other files including a font as the information to be distributed may be employed.

In the first, second, and third exemplary embodiments, the new task is registered to be executed before or after the execution date and time of the registered task. However, the execution date and time of the new task is not limited to the one described in the exemplary embodiments, and the time (one or a plurality of time periods) when the new task can be executed may be specified. For example, the time period after the execution date and time of the first registered task and before the execution date and time of the second registered task may be specified as the executable time of the new task.

The information processing apparatus or the information processing method according to the exemplary embodiments of the present invention can be realized by storing a computer program for realizing the information processing apparatus or the information processing method in a computer-readable storage medium and allowing each computer to read and execute the computer program stored in the computer-readable storage medium. More specifically, the present invention includes the computer program itself for realizing the function processing according to the exemplary embodiments of the present invention.

The storage medium for supplying the program includes, for example, a hard disk, a magnetic storage medium such as a magnetic tape, a magneto-optical disk (MO), a compact disc read-only memory (CD-ROM), a CD-recordable (CD-R), CD-rewritable (CD-RW), a digital versatile disc ROM (DVD-ROM), a digital versatile disc-R (DVD-R), and a DVD-RW. Further, the present invention also includes a case where the computer program is supplied using a wireless/wired communication.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-180048 filed Jul. 10, 2008, which is hereby incorporated by reference herein in its entirety.

What is claimed is:

1. A network management apparatus that connects with a plurality of devices via a network and executes a task on at least one of the plurality of devices according to time information specified in the task, the network management apparatus comprising:
    at least one hardware processor, functioning as:
    a registration unit configured to register, in a database, a task for which a time when the task is executed is specified;
    a determination unit configured to determine, when a new task is registered, whether a related task scheduled to enable, by way of a firmware update, an operation of the new task exists in the database;
    a display unit configured to configured to display a selection screen for selecting a target device targeted by the new task from among the plurality of devices, in a case where the determination unit determines that the related task exists,
    wherein a related target device targeted by the related task in the database is selectable and a device which is not targeted by the related task in the database is displayed via the selection screen but is unselectable via the selection screen; and
    a specification unit configured to specify, in a case where the determination unit determines that the related task exists in the database, a time period when the new task is executable according to a time specified for the related task,
    wherein the registration unit does not accept the registration of the new task when a time when the new task is executed is not specified within the specified time period, and accepts the registration of the new task which targets the target device selected via the selection screen when the time when the new task is executed is specified within the specified time period, and
    wherein the specified time period is after the time specified for the related task in the database.

2. A method for controlling a network management apparatus connected to a plurality of devices via a network that executes a task on at least one of the plurality of devices and includes at least one processor, comprising:
    registering, in a database, a task for which a time when the task is executed is specified;
    determining, when a new task is registered, whether a related task scheduled to enable, by way of a firmware update, an operation of the new task exists in the database;
    displaying a selection screen for selecting a target device targeted by the new task from among the plurality of devices, in a case where it is determined that the related task exists,
    wherein a related target device targeted by the related task in the database is selectable and a device which is not targeted by the related task in the database is displayed via the selection screen but is unselectable via the selection screen; and
    specifying, in a case where it is determined that the related task exists in the database, a time period when the new task is executable according to a time specified for the related task,
    wherein there is no acceptance of the registration of the new task when a time when the new task is executed is not specified within the specified time period, and there is acceptance of the registration of the new task which targets the target device selected via the selection screen when the new task is executed is specified within the specified time period, and
    wherein the specified time period is after the time specified for the related task in the database.

3. A non-transitory computer-readable medium storing a computer-executable process, the computer executable-process causing a computer to execute a method for controlling a network management apparatus connected to a plurality of devices via a network that executes a task on at least one of the plurality of devices and includes at least one processor, comprising:
    registering, in a database, a task for which a time when the task is executed is specified;
    determining, when a new task is registered, whether a related task scheduled to enable, by way of a firmware update, an operation of the new task exists in the database;
    displaying a selection screen for selecting a target device targeted by the new task from among the plurality of devices, in a case where it is determined that the related task exists,
    wherein a related target device targeted by the related task in the database is selectable and a device which is not targeted by the related task in the database is displayed via the selection screen but is unselectable via the selection screen; and
    specifying, in a case where it is determined that the related task exists in the database, a time period when the new task is executable according to a time specified for the related task,
    wherein there is no acceptance of the registration of the new task when a time when the new task is executed is not specified within the specified time period, and there is acceptance of the registration of the new task which targets the target device selected via the selection screen when the new task is executed is specified within the specified time period, and
    wherein the specified time period is after the time specified for the related task in the database.

* * * * *